May 11, 1943.　　S. YERKOVICH　　2,318,828
PHONOGRAPH
Filed Nov. 23, 1940　　16 Sheets-Sheet 1

INVENTOR
SIMON YERKOVICH
BY
Blair, Curtis & Hayward
ATTORNEYS

Fig. 4.

May 11, 1943.  S. YERKOVICH  2,318,828
PHONOGRAPH
Filed Nov. 23, 1940   16 Sheets-Sheet 6

INVENTOR
SIMON YERKOVICH
BY
Blair, Curtis & Hayward
ATTORNEYS

May 11, 1943.  S. YERKOVICH  2,318,828

PHONOGRAPH

Filed Nov. 23, 1940  16 Sheets-Sheet 7

INVENTOR
SIMON YERKOVICH
BY
Blair, Curtis & Hayward
ATTORNEYS

May 11, 1943.  S. YERKOVICH  2,318,828
PHONOGRAPH
Filed Nov. 23, 1940  16 Sheets-Sheet 8

INVENTOR
SIMON YERKOVICH
BY
Blair, Curtis & Hayward
ATTORNEYS

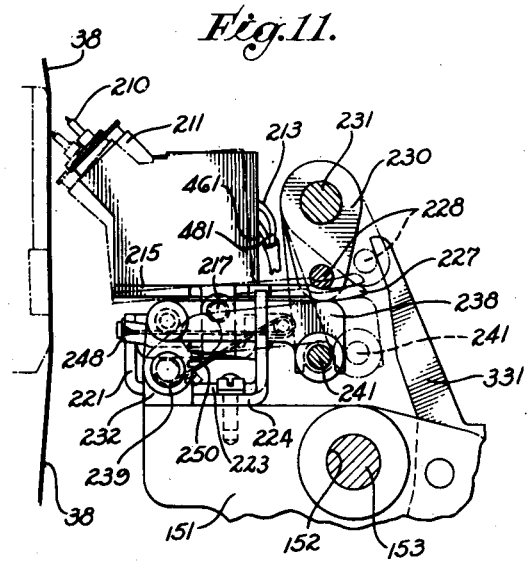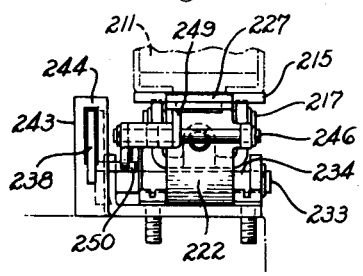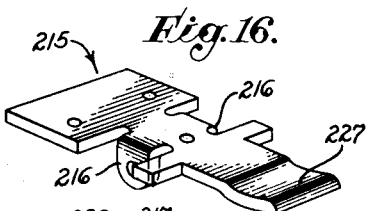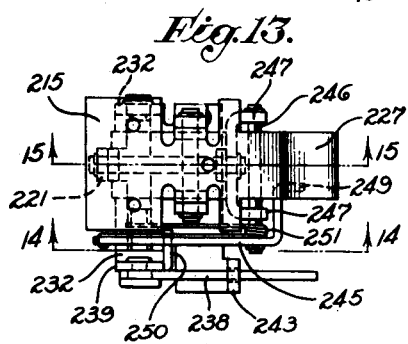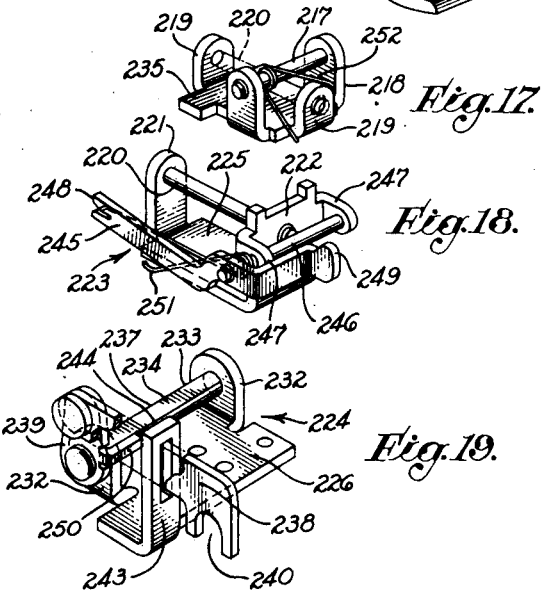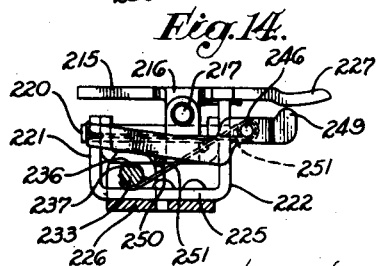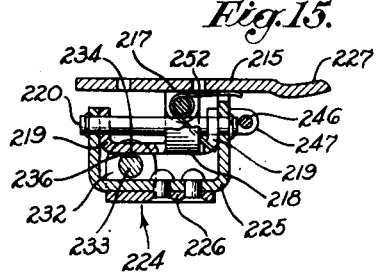

May 11, 1943. S. YERKOVICH 2,318,828
PHONOGRAPH
Filed Nov. 23, 1940 16 Sheets-Sheet 10
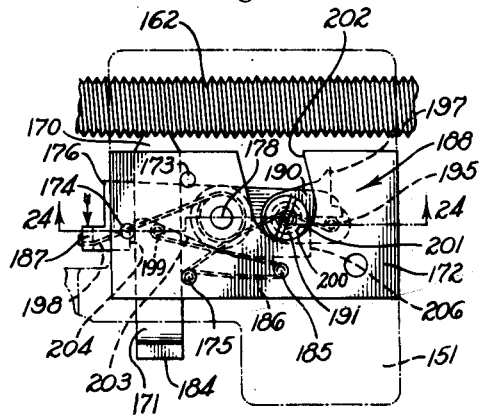
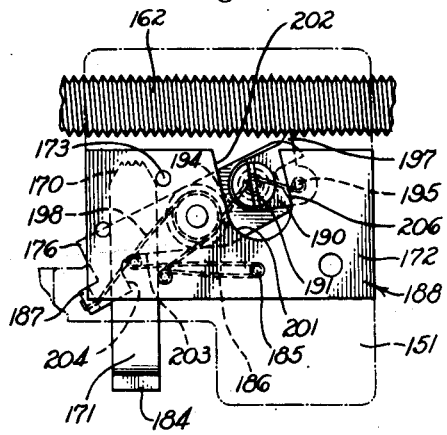
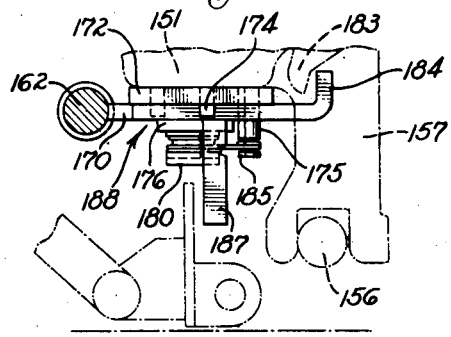
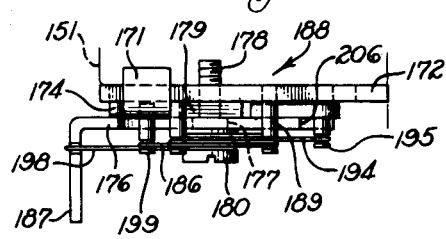
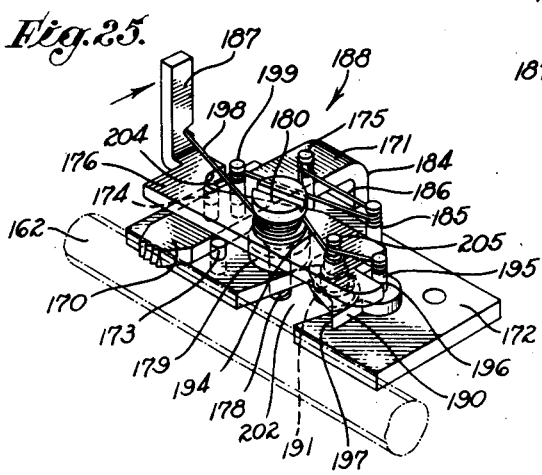
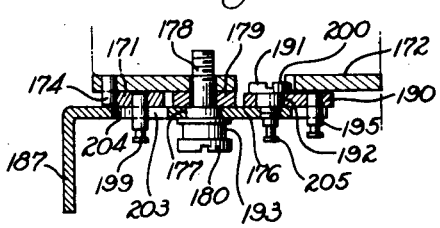
INVENTOR
SIMON YERKOVICH
BY
ATTORNEYS May 11, 1943.  S. YERKOVICH  2,318,828
PHONOGRAPH
Filed Nov. 23, 1940   16 Sheets-Sheet 11
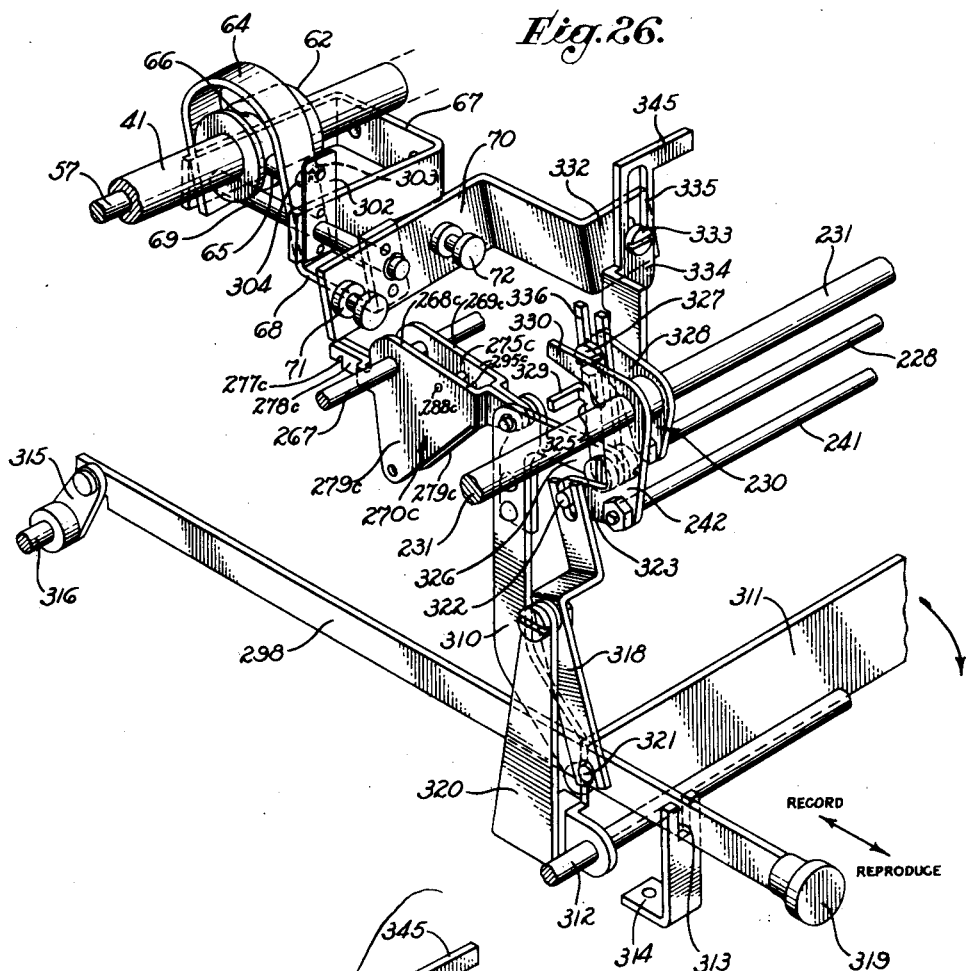
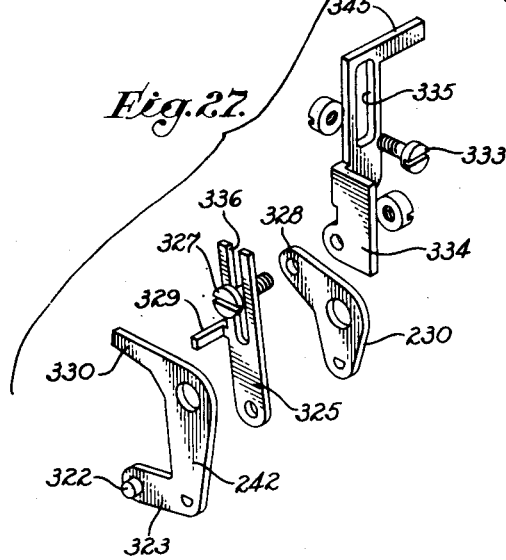
INVENTOR
SIMON YERKOVICH
BY
Blair, Curtis + Hayward
ATTORNEYS

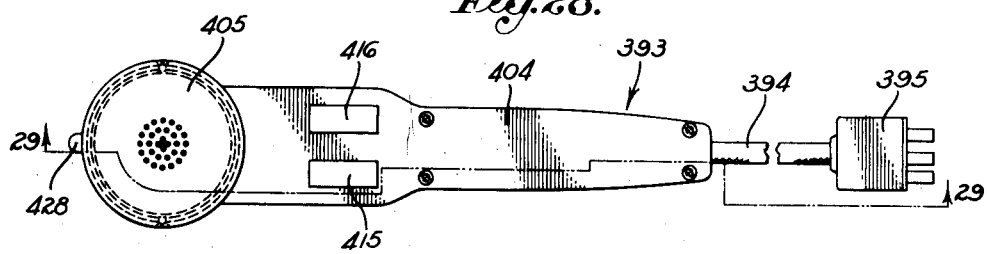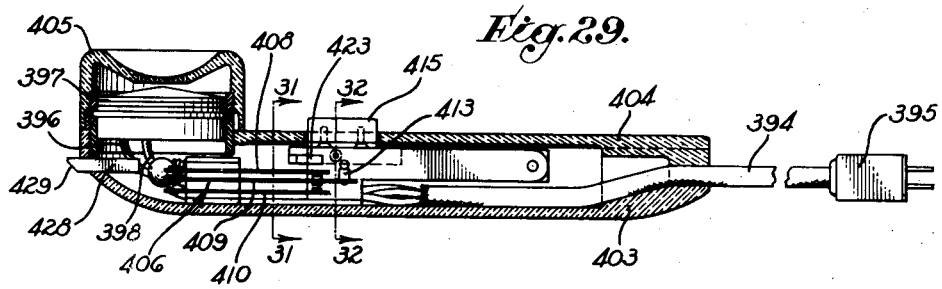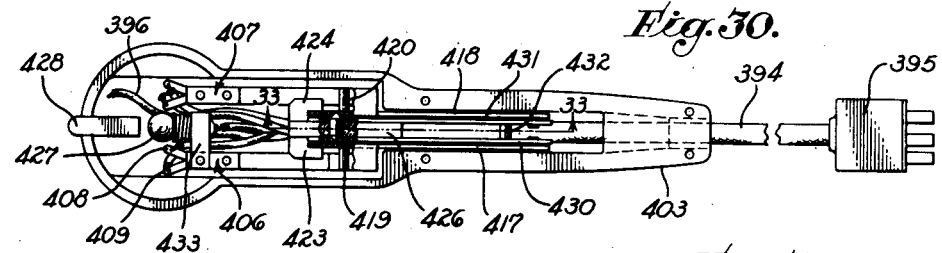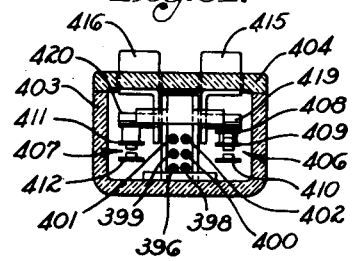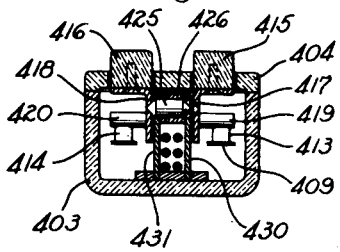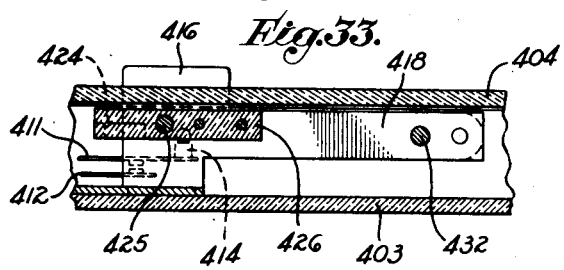

May 11, 1943. S. YERKOVICH 2,318,828
PHONOGRAPH
Filed Nov. 23, 1940 16 Sheets-Sheet 13
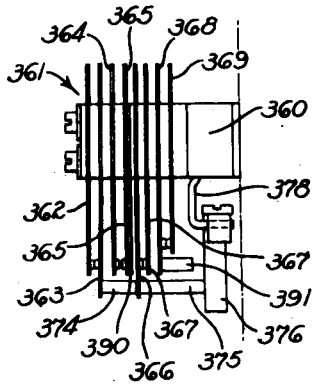
Fig. 35.
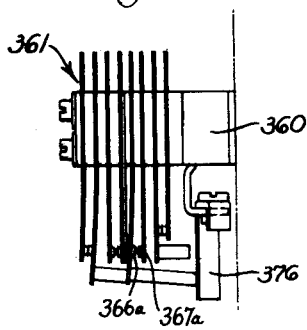
Fig. 36.
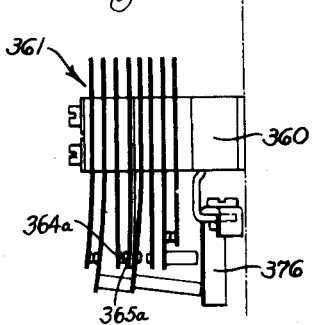
Fig. 37.
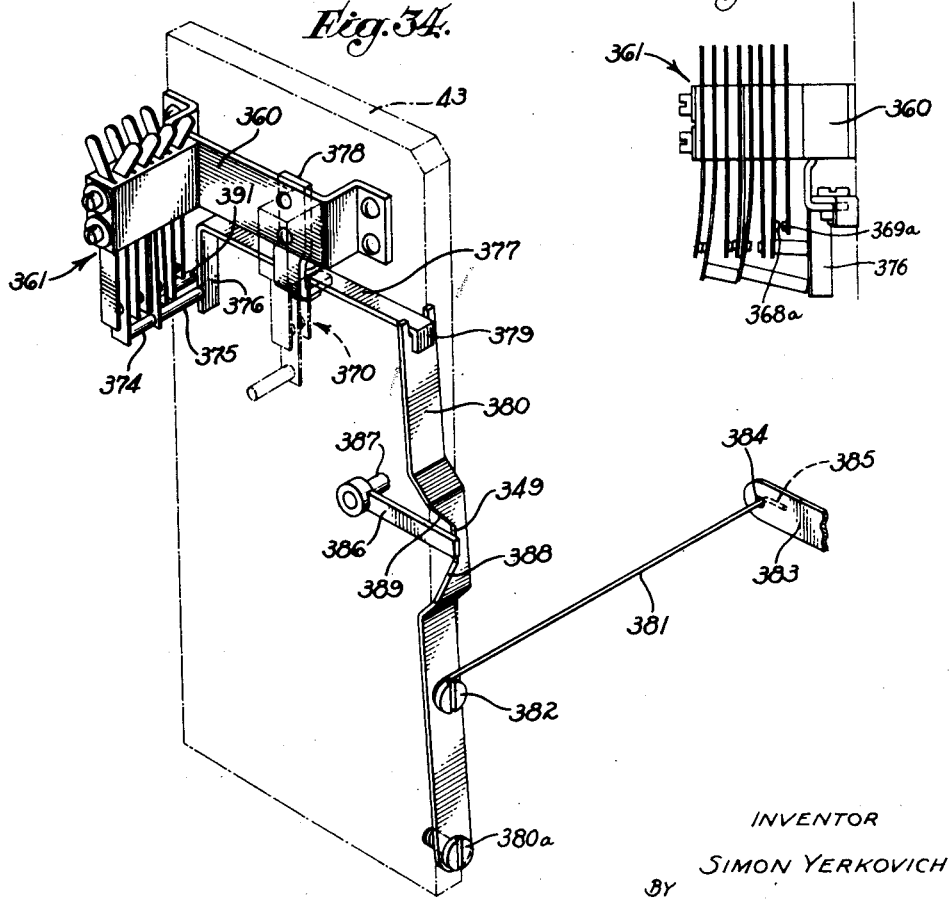
Fig. 34.
Fig. 38.
INVENTOR
SIMON YERKOVICH
BY
Blair, Curtis & Hayward
ATTORNEYS

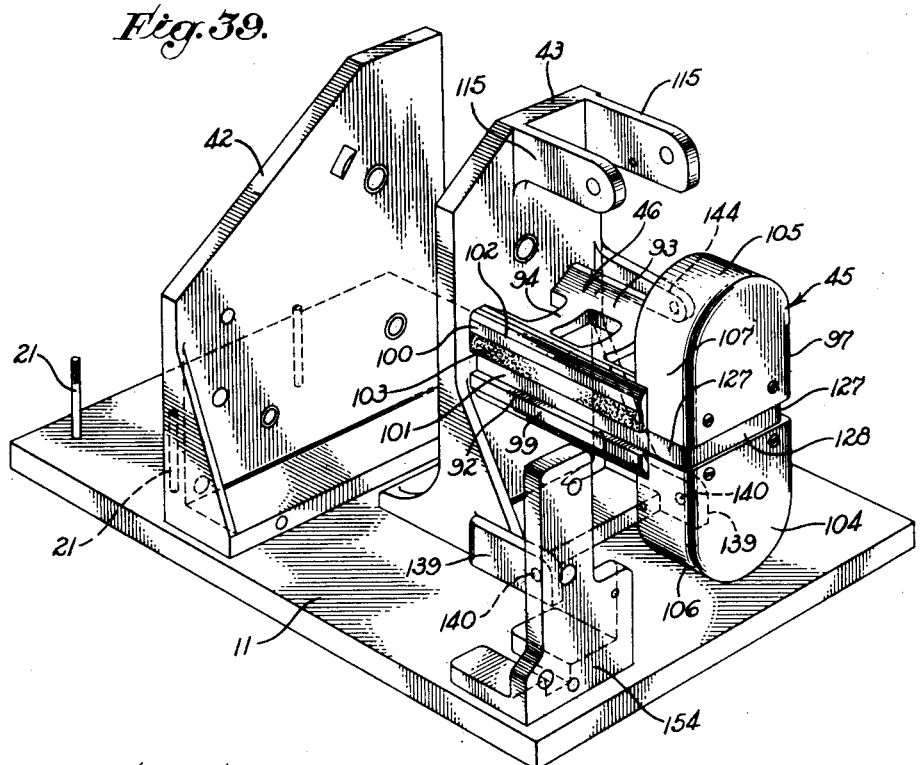
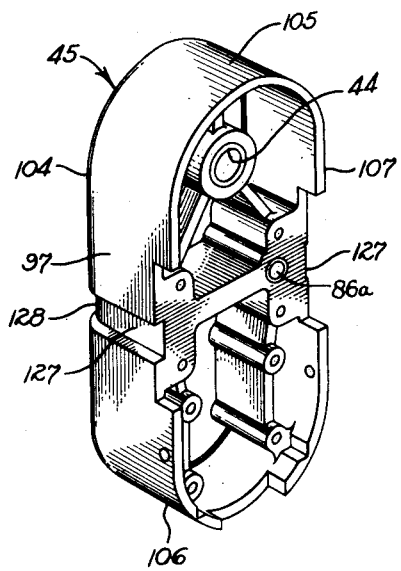
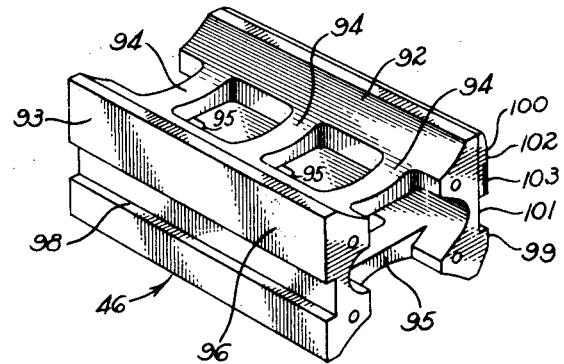
INVENTOR
SIMON YERKOVICH
BY
Blair, Curtis & Hayward
ATTORNEYS

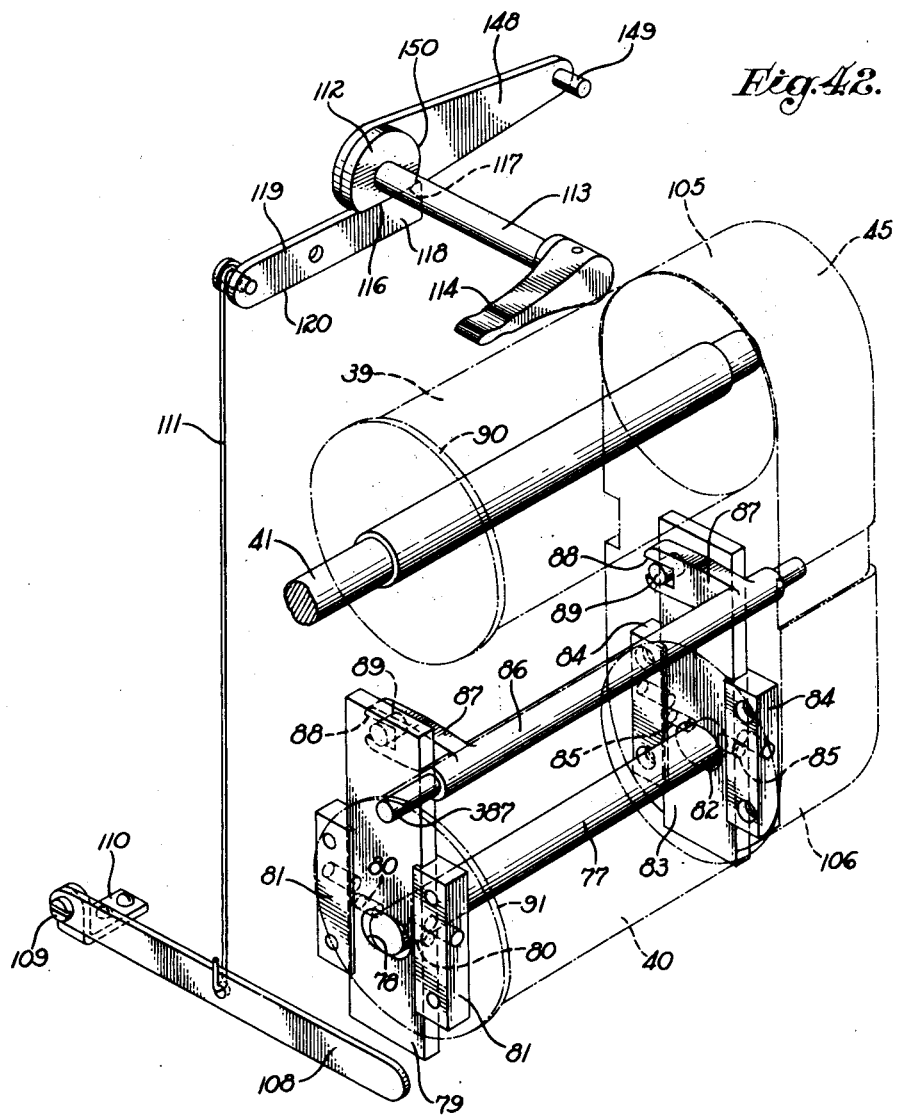

May 11, 1943.　　　S. YERKOVICH　　　2,318,828
PHONOGRAPH
Filed Nov. 23, 1940　　　16 Sheets-Sheet 16
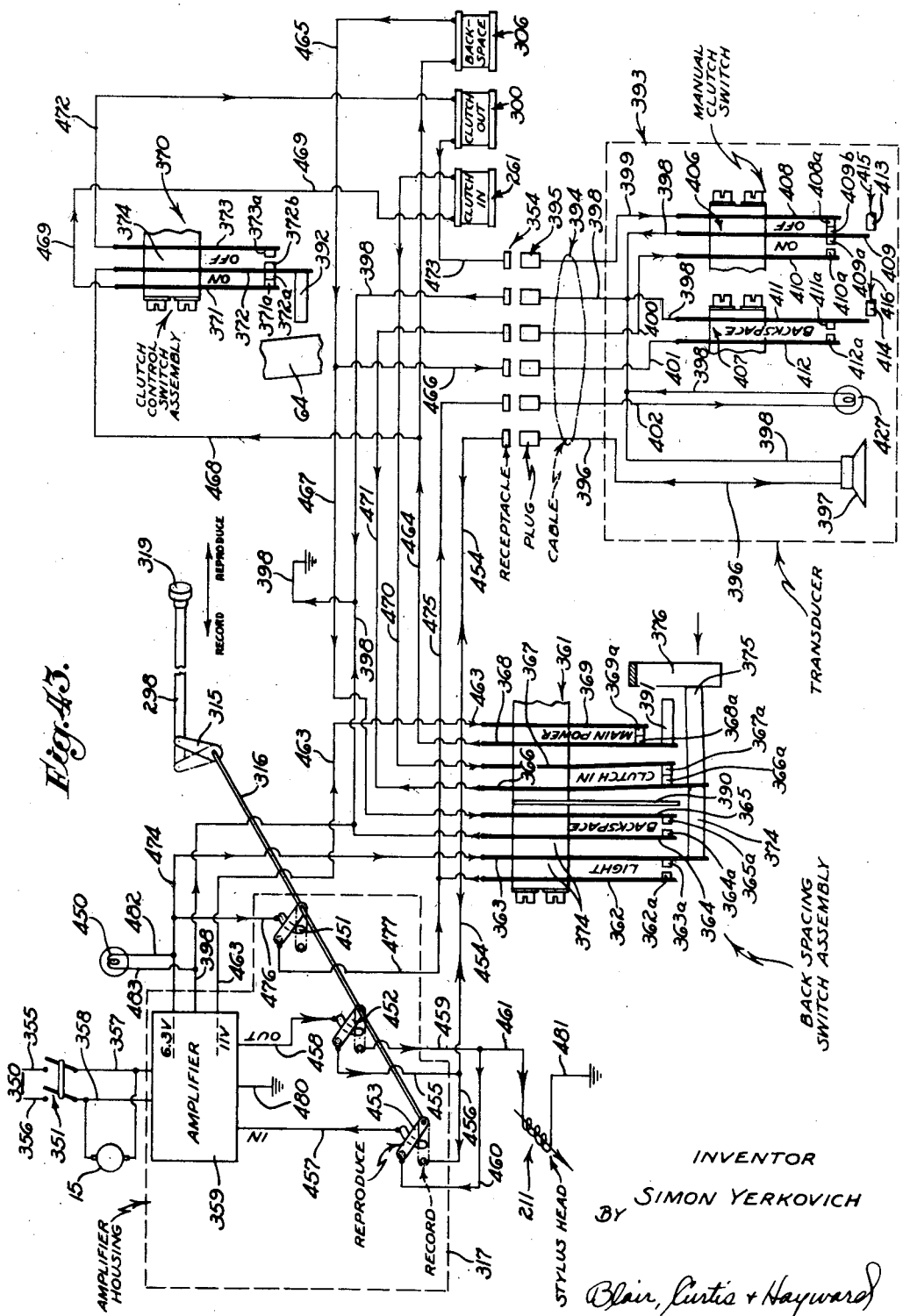
INVENTOR
SIMON YERKOVICH
BY
Blair, Curtis + Hayward
ATTORNEYS Patented May 11, 1943

2,318,828

UNITED STATES PATENT OFFICE 2,318,828

PHONOGRAPH

Simon Yerkovich, Bridgeport, Conn., assignor to Dictaphone Corporation, New York, N. Y., a corporation of New York Application November 23, 1940, Serial No. 366,849

39 Claims. (Cl. 274—11)

This invention relates to machines or apparatus for translating vibrations between a record medium and a vibratable medium, and has especial adaptation to an apparatus of this character for translating vibrations of audio-frequency. The embodiment of the invention herein described and shown in the accompanying drawings is a dictating and/or transcribing machine, and while the invention was conceived and developed and reduced to practice in connection with the design and manufacture of a dictating and/or transcribing machine, and while some of the features of the invention are particularly adaptable to such a machine, some of the features of invention are not limited to such a machine.

It is an object of this invention to provide an apparatus designed for the effective use of an endless flexible record loop which has many advantages over inflexible record elements in the form of cylinders or discs which are used in many types of vibration translating machines. The record element consists of an endless loop of thin filmlike material such as acetate which is capable of having formed thereon a record groove by an embossing or cutting stylus. Such record elements are not readily injured, deformed, or torn, and need not be placed in protective containers. They are easily handled, easily stored, may be sent through the mails, and, because of their inexpensive character, may be used for only one recording and then kept as a permanent record.

A further object of this invention is to provide for an efficient and practical means of mounting such a flexible loop in position for cooperative engagement with the translating device.

It is another object of this invention to provide, in such a mounting device, means for its ready adjustment to facilitate the removal and replacement of a record loop.

In machines for translating vibrations to and from a record medium, provision is made for the removable mounting of a record in cooperative position with the translating device and for causing relative motion of the record and translating device.

It is one of the objects of this invention to provide for a safety control of the motion causing means responsive to the operation of removal or placement of a record.

In vibration translating machines, provision is usually made for moving the translating device, such as the stylus in a sound recording and reproducing machine, into and out of cooperative engagement with the record.

It is one of the objects of this invention to provide automatic control for the disposition of the translating device in this respect responsive to the operation of removing a record from the machine.

In machines of this character which are designed for both recording and reproduction of vibrations, provision is made for conditioning the translating device for one or the other of these two operations. In the machine herein shown and described, this alternative conditioning of the translating head is accomplished by alternatively conditioning the mounting in a translating device of a single stylus.

One of the objects of this invention is to provide for the automatic control of this conditioning operation responsive to operation of removal of a record.

It is also an object of this invention to provide a visual indicating means responsive to the removal of a record from the machine.

It is also an object of the invention to provide for the automatic cessation of the traversing movement of a traversable translating device upon its arrival at the limit of its range of traversing movement, and to provide visual indication to the operator that the limit of traversing movement has been reached.

Dictating and transcribing machines are provided with means for backspacing the traversable stylus head. In the machine shown and described herein, this backspacing means in power operated. One of the objects of this invention is to correlate the backspacing means with the operation of removal of a record element from the machine, and also to correlate it with the arrival of the traversable head at the limit of its range of traversing movement.

It is also an object of this invention to correlate for the proper operation of the machine and for safety purposes, by interlocking and control means, the backspacing means, the means for moving the translating device into and out of cooperative engagement with the record element, and means for conditioning the translating device for recording or reproduction, and a visual indicator, with each other and with the operation of removal and placement of a record element, and with the arrival of a traversable translating device at the limit of its range of traversing movement.

Other objects and advantages and features of this invention will be apparent from the following description and drawings of the invention and claims.

Several inventions are disclosed in the descriptive matter and drawings of this application which are not claimed herein. Because the inventorship of these inventions not claimed herein is different from that of the subject matter of this application, they are being disclosed and claimed in other and separate applications.

Referring to the drawings, which are for illustrative purposes only,

Figure 4 shows a transverse vertical section of the machine taken along the line 4—4 of Figure 1;

Figure 11 is a fragmentary sectional elevational view showing the recording-reproducing head and adjacent parts taken along the line 11—11 of Figure 1;

Figure 12 is a rear view of the stylus head mount shown in Figure 11;

Figure 13 is a top plan view of the stylus head mount shown in Figure 12;

Figure 14 is a vertical sectional view taken along the line 14—14 of Figure 13;

Figure 15 is a vertical sectional view taken along the line 15—15 of Figure 13;

Figure 16 is a perspective view of the stylus head trunnion plate;

Figure 17 is a perspective view of the stylus head cradle;

Figure 18 is a perspective view of the stylus head conditioning trunnion;

Figure 19 is a perspective view of the stylus head conditioning bracket;

Figure 20 is a top plan view showing the backspacer mechanism, taken along the line 20—20 of Figure 1;

Figure 21 is a view similar to Figure 20, showing the parts in a position at the end of a cycle of movement of the backspacing mechanism;

Figure 22 is a left-hand elevation of the backspacing mechanism shown in Figure 20;

Figure 23 is a front elevation of the same;

Figure 24 is a vertical section taken along the line 24—24 of Figure 20;

Figure 25 is a perspective view of the backspacing mechanism viewed from below;

Figure 26 is a perspective front view showing the construction and relationship of the mechanical interlocking members of the machine;

Figure 27 is an exploded perspective of the members shown in the central portion of Figure 26;

Figure 28 is a top plan view of the transducer;

Figure 29 is a vertical longitudinal section taken along the line 29—29 of Figure 28;

Figure 30 is a top plan view of the transducer with the cover removed;

Figure 31 is a transverse vertical section taken along the line 31—31 of Figure 29;

Figure 32 is a transverse vertical section of the transducer taken along the line 32—32 of Figure 29;

Figure 33 is a longitudinal vertical section taken along the line 33—33 of Figure 30;

Figure 34 is a perspective front view showing the limit switch assembly and the clutch control switch assembly, and the mechanism by which they are operated;

Figure 1:
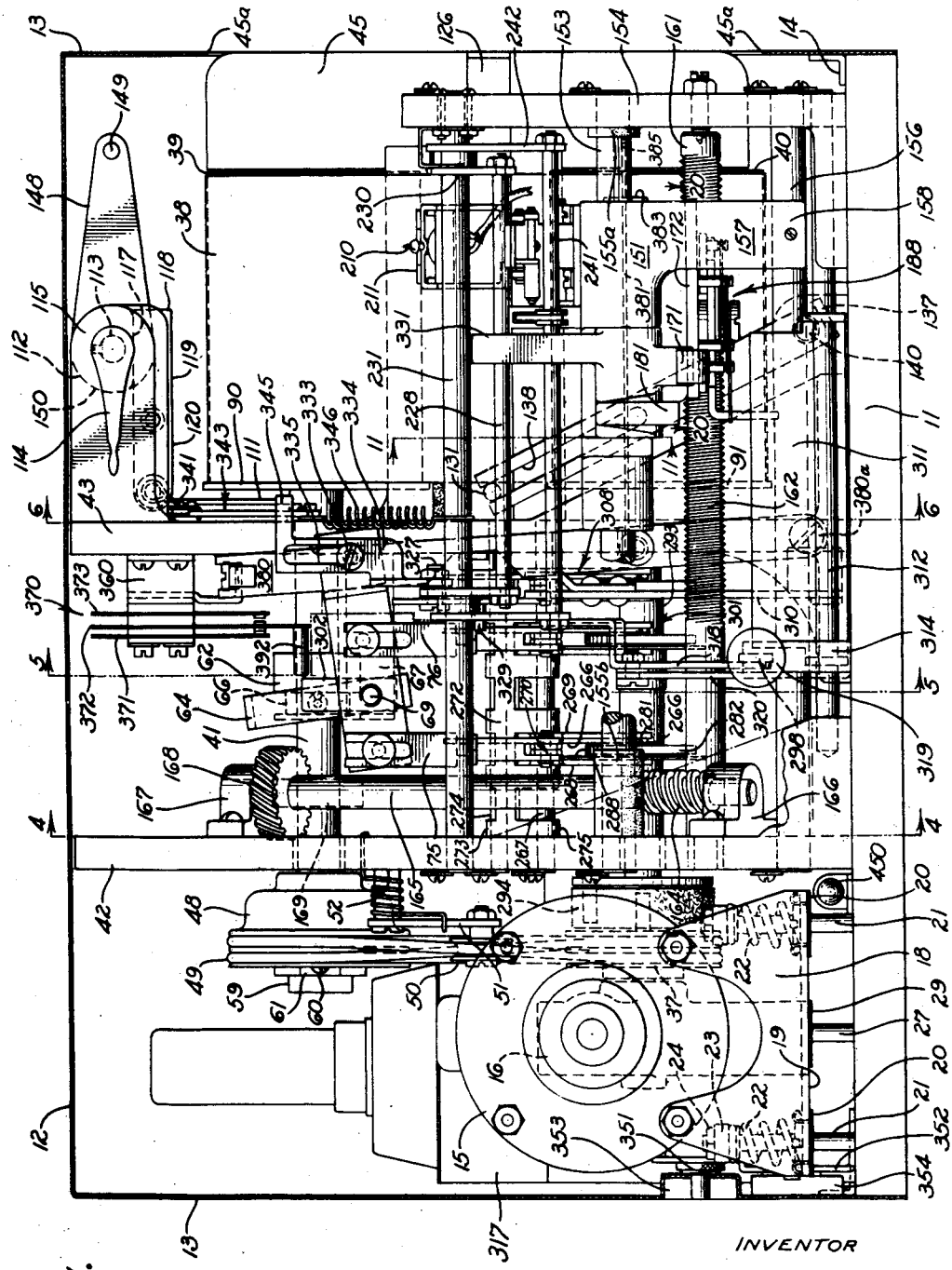
Figure 1 is a front elevational view of a dictating and transcribing machine embodying the invention with the front cover wall cut away.

Figures 35 to 38 inclusive show sequentially the relative positions assumed by the leaves of the limit switch assembly during its operation;

Figure 39 is a perspective front view showing the main frame elements of the machine;

Figure 40 is a perspective rear view of the drum end casting;

Figure 41 is a perspective rear view of the anvil supporting casting;

Figure 42 is a perspective front view of the drum shaft mounting with the drums and the drum end casting shown in phantom lines; and Figure 43 is a wiring diagram showing the electrical elements of the machine and their electrical connections.

In all of the figures of the drawings, the machine is shown in solid lines in the neutral position.

In the following description, the words "front and rear" and "forward and rearward" are used relative to the front of the machine which is toward the observer in Figure 1. The words "right and left" and "rightward and leftward" are used from the standpoint of an observer looking toward the front of the machine. The word "translating" has been used to describe the operation of setting up vibrations in correspondence to a record of vibrations or making a record of vibrations in correspondence to vibrations received. The word "transducer" has been used to mean a combination microphone and speaker.

Base and cover

The machine is mounted on a rectangular base plate 11, preferably made of aluminum. A removable cover 12 (Figure 1) having the shape shown in Figure 8 fits down over the base plate 11 for closing the machine and protecting it from dirt and accidental contact with external objects. Angle-iron cleats 14 (Figure 1) secured across the inner faces of end walls 13 of the cover adjacent the lower edges thereof engage the upper face of the base plate 11 when the cover is lowered into position serving to support it on the base plate with the lower edges of the cover walls in horizontal registry with the under face of the base plate 11.

Motor and drive

An electric motor 15 (Figure 3) and a gear housing 16, which is secured to the motor by means of bolts 17, are flexibly mounted upon the base plate 11 in a manner to permit limited movement of the motor and gear housing both vertically and laterally with respect to the base. A bracket 18 bolted to the outer end of the motor 15 is formed at its lower edge with an inwardly extending horizontal flange 19, the two apertured ends of which are fitted with clamp rings 20 and through which project studs 21 rigidly mounted in the base plate 11. The lower ends of tension springs 22 are secured in the clamp rings 20, and the upper ends of these springs are retained in a circumferential groove about the lower ends of adjustable nuts 23 threaded on the upper ends of the studs 21 and locked in position by lock nuts 24.

The gear housing 16 is formed with an integral depending bracket 25 having at its lower end a horizontal flange 26 disposed in the central vertical plane of the motor. This flange is apertured to encircle a stud 27 mounted on the base plate 11, and a spring 28 similar to the springs 22 is similarly secured at its lower end to a clamp ring 29 and at its upper end to an adjusting nut 30 threaded on the upper end of the stud 27 and locked in position by a lock nut 31.

Since the pull of the belting by which the motor transmits power to the machine is in an upward direction when the motor is in operation, as will be presently described, the tension in the spring 28 will be decreased and may even under some conditions of operation be converted to compression. At the same time the tension in the springs 22 may be increased. This spring mounting of the motor and gear housing effectively dampens, with respect to the base plate and the operating parts of the machine carried by the base plate, any vibrations of the motor due to improper balance of the armature or otherwise. A motor shaft 32 carries a cooling fan 33 and is connected to a shaft 34 journalled in the gear housing by means of a sleeve coupling 35.

A horizontal shaft 36, also journalled in the gear housing 16, is rotated by a reducing worm gear engagement with the shaft 34. Mounted on the projecting end of the shaft 36 is a double-grooved pulley 37.

Figure 6:
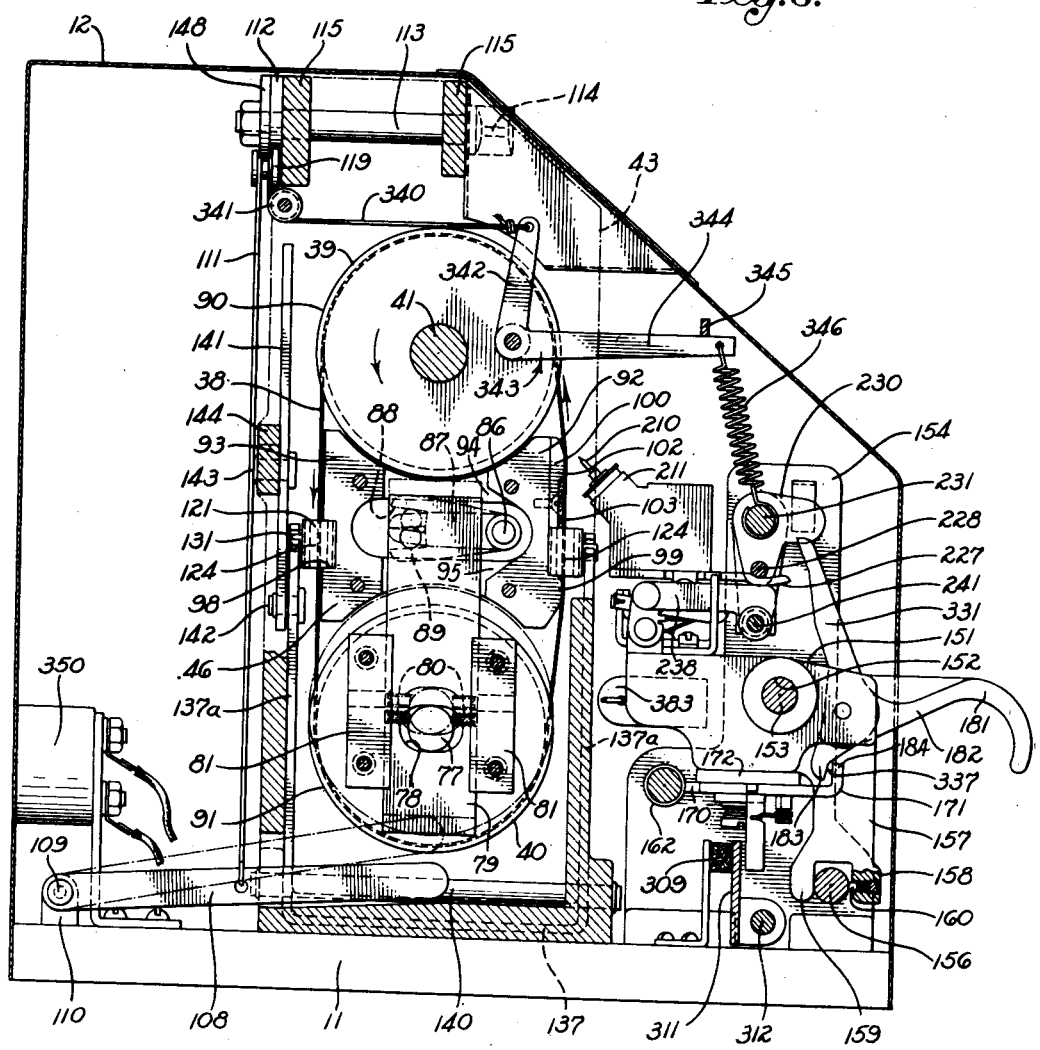
Figure 6 is a transverse vertical section of the machine taken along the line 6—6 of Figure 1.
Figure 8:
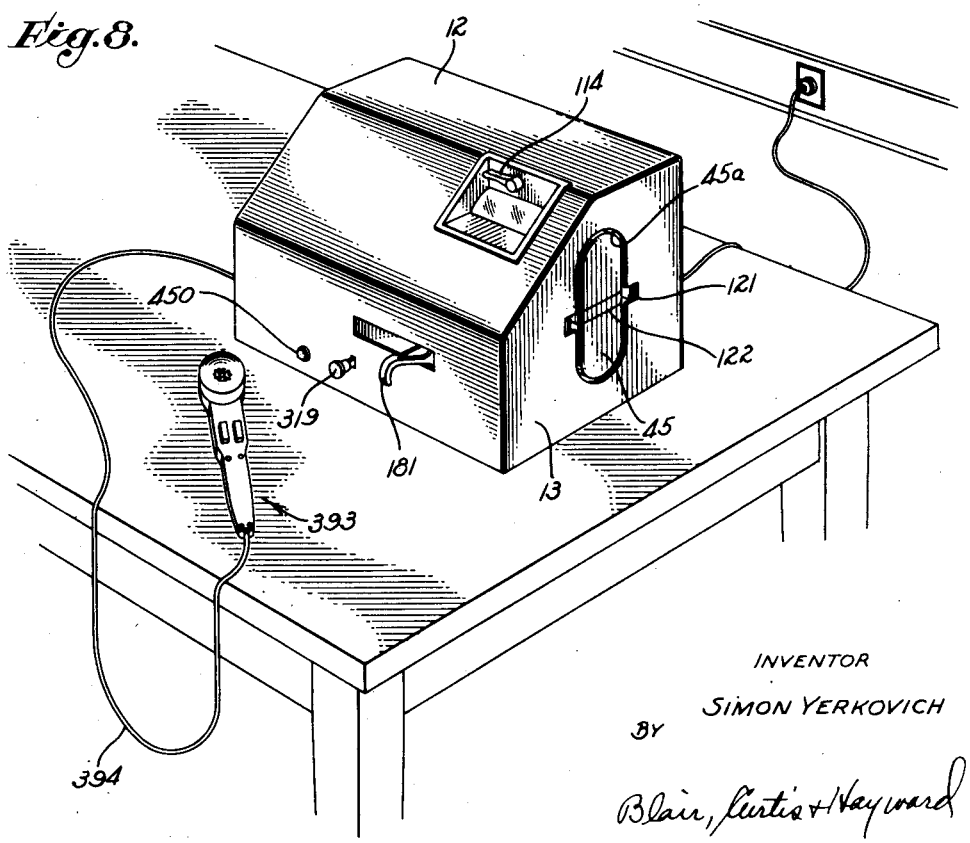
Figure 8 is a perspective front view showing the machine with cover in place and connected to a wall outlet, and also showing the transducer connected to the machine by a flexible cord.

The machine records sound by embossing a sound groove on a record loop 38 of flexible material carried by an upper horizontal drum 39 and a lower horizontal drum 40 (Figures 6 and 42). The drum 39 is rigidly mounted upon and rotates with a main drive shaft 41 which is journalled in bearings in two vertical plate bulkheads 42 and 43 (Figures 1, 2, and 39) which are secured to the base plate 11 and constitute the mounting means for many of the parts of the machine. The main shaft 41 is also journalled in a bearing 44 (Figure 2) in a vertically disposed end casting 45 (Figure 40) which projects through an opening 45a in the end wall 13 of the cover 12 so that its outer end face 104 is flush with the outer face of the cover end wall 13 (Figures 1 and 8). The end casting 45 is held in position by a horizontal casting 46 (Figures 2, 39, and 41) to which it is secured by machine screws 47a, the casting 46 being in turn rigidly secured to the bulkhead 43 in a position between the two drums 39 and 40 (see also Figure 6). The shaft 41 is suitably shouldered to have end thrust engagement with the bearing in the bulkhead 43 and the bearing 44, whereby it is prevented from endwise displacement.

*Clutch*

Figure 3:
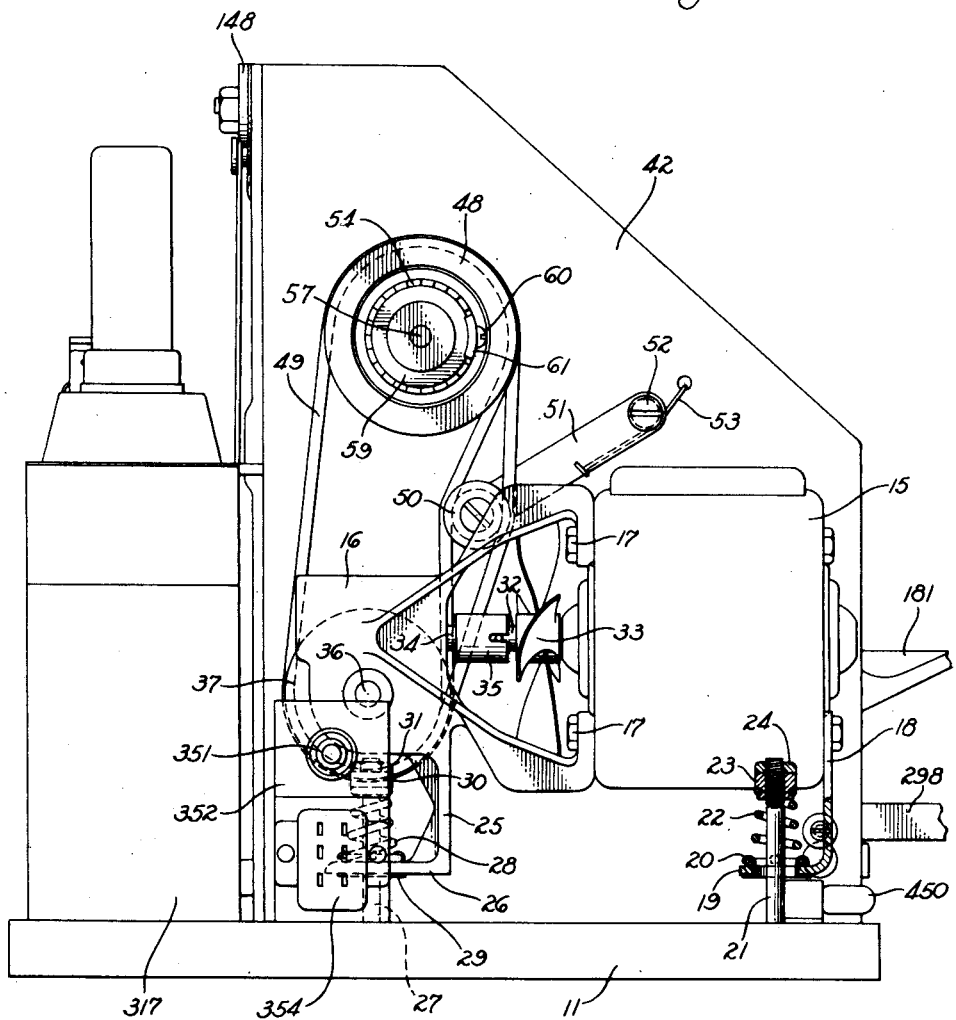
Figure 3 is an elevational view of the left end of the machine with the cover removed.
Figure 9:
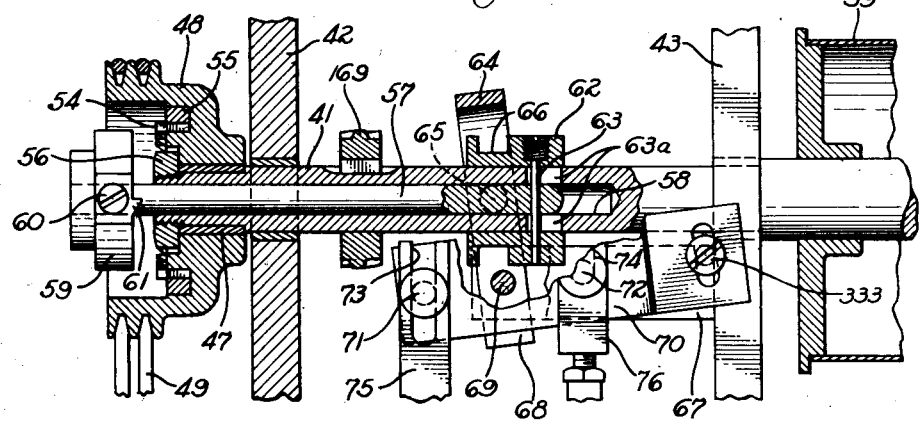
Figure 9 is a vertical sectional elevational view of the drum driving shaft.

On the left end of the shaft 41, as viewed in Figure 1, is fixed a bearing sleeve 47 upon which rotates a double-grooved pulley 48 (see Figure 9). Referring to Figures 1 and 3, it will be seen that the pulley 48 is driven from the pulley 37 by means of a belt 49 which is double-reeved about these two pulleys. Proper tension in the belt 49 is maintained by means of an idler pulley 50 carried at the outer end of an arm 51 which is pivotally mounted on the bulkhead 42 at 52 and urged resiliently upward by a spring 53.

Figure 10:
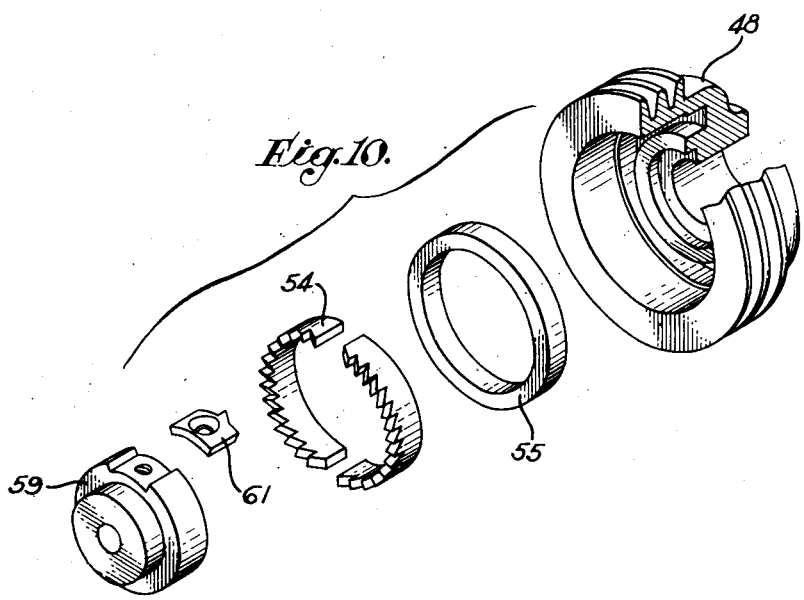
Figure 10 is an exploded perspective view of the pulley and clutch hub shown in Figure 9.

Power is transmitted from the pulley 48 to the shaft 41 by means of the clutch mechanism shown in Figures 9 and 10. The pulley 48 carries an annular toothed clutch jaw 54 secured in rigid relationship with the pulley 48 by means of a press-fitted retainer band 55. The pulley 48 is held in position longitudinally with respect to the shaft 41 by a ring nut 56 threaded upon the end of the shaft. A shaft 57 slidably fits within a bore 58 of the shaft 41. At the outer end of the shaft 57 is rigidly secured a clutch hub 59 in the rim of which is fastened by means of a screw 60 a clutch tooth 61 adapted to engage the teeth of the clutch jaw 54.

Through a sleeve 62 which is longitudinally slidably mounted upon the shaft 41, there is threadably secured a diametral pin 63 which passes through a diametral aperture disposed across the inner end of the shaft 57, thereby locking together in rigid relationship the sleeve 62 and shaft 57. Slots 63a in the shaft 41 permit limited longitudinal movement of the pin 63, sleeve 62, and shaft 57 with respect to the shaft 41. When the pin is at one limit of this range of movement, as shown in Figure 9, the tooth 61 is held out of engagement with the jaw 54. When the pin is at the other or right-hand end of the slots 63a, the tooth 61 is in engagement with the jaw 54, and the pulley 48 has a driving connection with the shaft 41.

Figure 4:
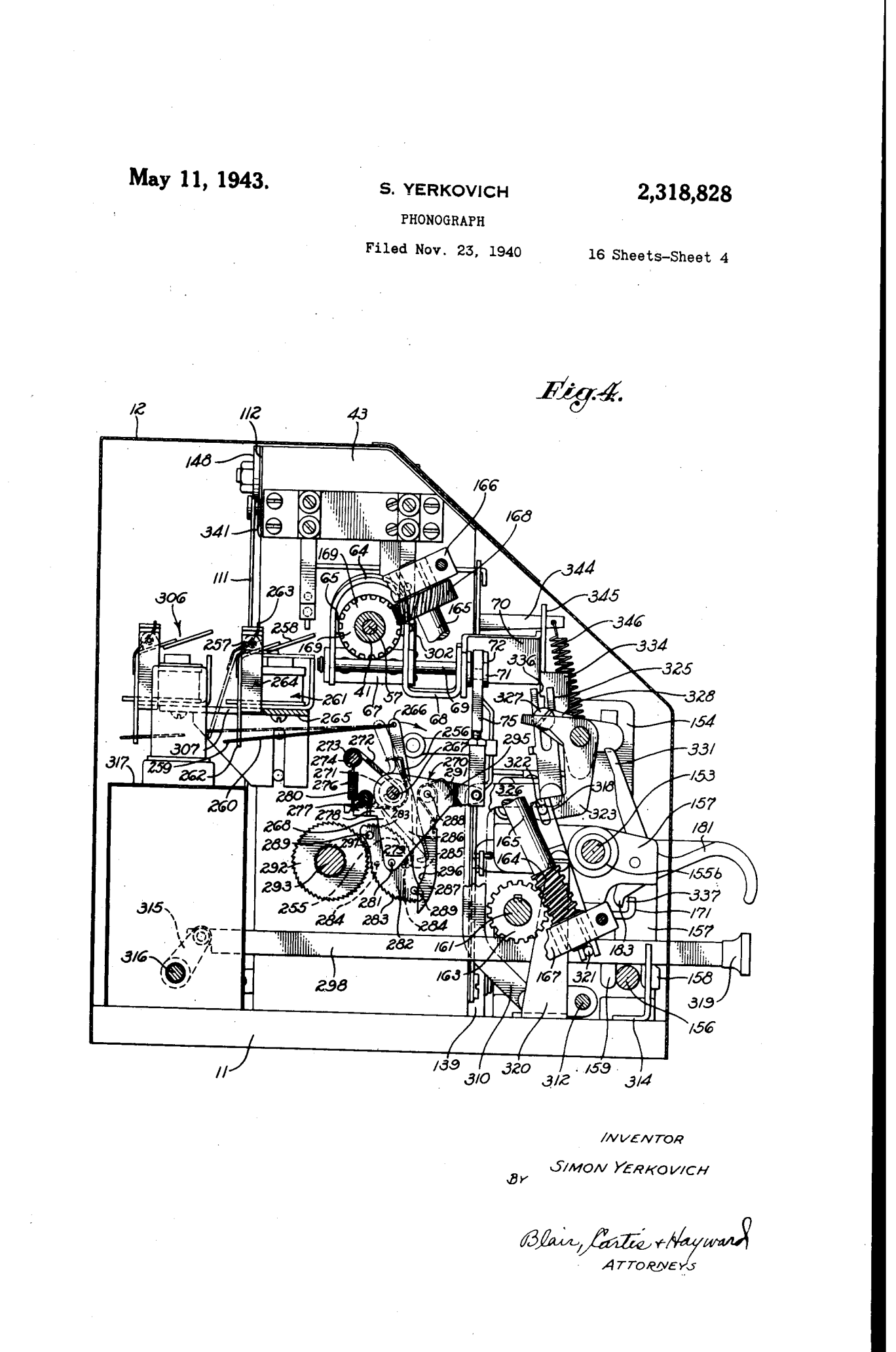
Figure 5:
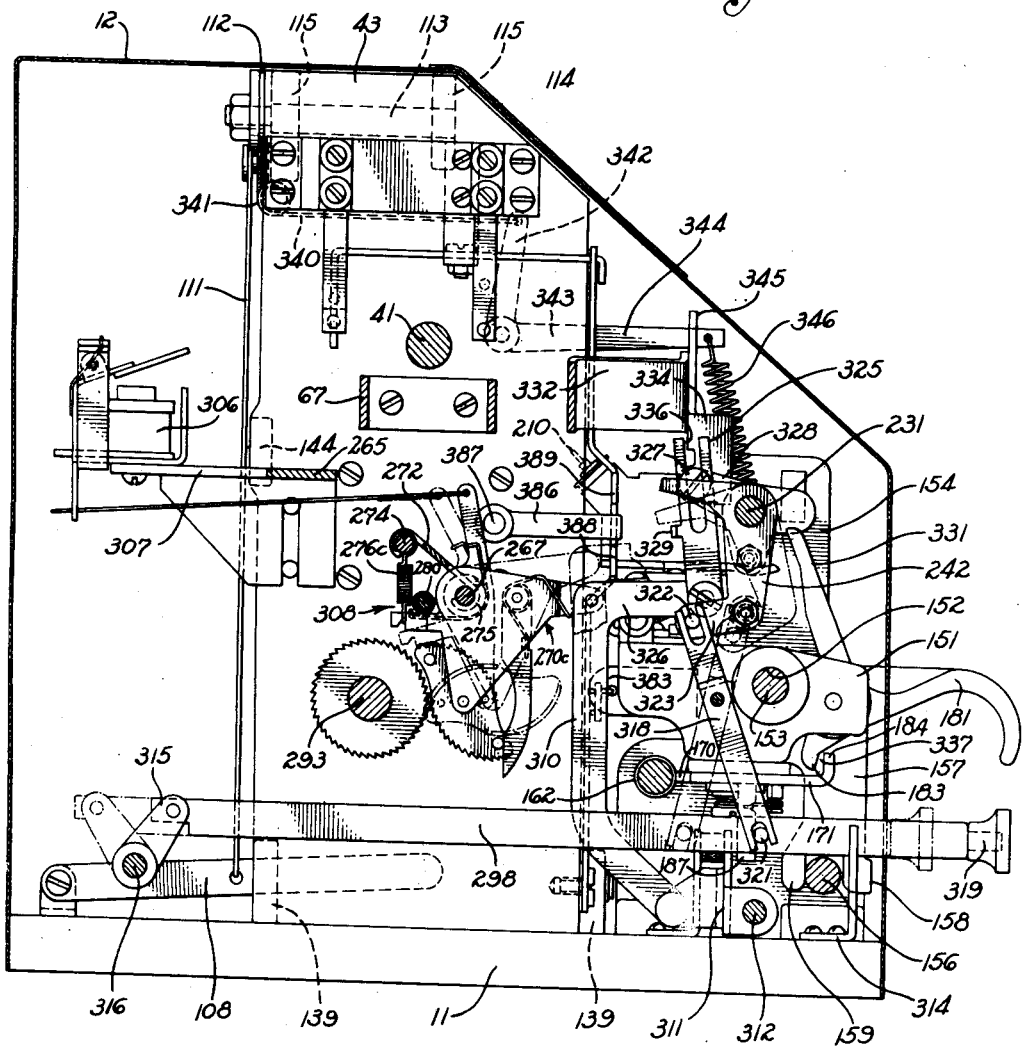
Figure 5 is a transverse vertical section of the machine taken along the line 5—5 of Figure 1.

The sleeve 62 is shifted along the shaft 41 (see Figure 26) by means of a yoke 64 carrying follower lugs 65 engaging a circumferential groove 66 in the sleeve, this yoke being pivotally mounted on a U-shaped bracket 67 (see also Figures 4 and 5) which is bolted to the bulkhead 43. Referring to Figures 4 and 26, a stationary shaft 69 is secured to one of the arms of the bracket 67. The yoke 64 is formed with a lower U-shaped extension 68, to the outer end of which is riveted a lever arm 70, this lever arm and the three legs of the yoke 64 having bores by which they are rotatively mounted upon the stationary shaft 69. The lever arm 70 carries two headed pins 71 and 72 which engage slotted openings 73 and 74 respectively (see also Figures 1 and 9) formed in the upper ends of push rods 75 and 76.

It will be apparent that when the left-hand push rod 75 is elevated, the clutch mechanism is operated to connect the pulley 48 with the shaft 41 by means of the clutch tooth 61 and jaw 54, effecting rotation in the direction indicated by the arrow (Figure 6) of the shaft 41 and of the upper drum 39, which is rigidly mounted upon the shaft 41, as above described. In this manner the record loop 38 is caused to move in an endless path about the upper and lower drums in the direction indicated by the arrows in Figure 6. When the right-hand push rod 76 is elevated, the clutch mechanism is operated to disconnect the pulley 48 from the drive shaft 41 to stop rotation of the shaft and the upper drum 39 and movement of the record loop 38. The lower drum, which is idly carried on its shaft, is mounted in a manner to afford the requisite tension in the record loop to cause the upper drum 39 to move the loop about the two drums.

*Drum mount*

Referring to Figure 42 and also to Figures 2, 6, 7, 39, 40, and 41, the drum 40 is rotatably mounted upon a stationary shaft 77. The left end of this shaft is seated in a horizontally disposed, parallel sided aperture 78 formed in a slide plate 79, the width of the aperture being such that the shaft is readily accommodated between the upper and lower walls thereof. As shown in Figure 6, set screws 80 serve to adjust the end of the shaft laterally in the aperture 78, and, being disposed in a plane above the center line of the aperture, also serve to hold the shaft in tight contact with the lower wall of the aperture, definitely fixing the vertical relationship of the shaft with the slide plate 79.

This slide plate is vertically movable between guide blocks 81, which are secured by screws to the base of the bulkhead 43. The right end of the shaft 77 is likewise mounted in a similar aperture 82 in a slide plate 83 vertically movable between guide blocks 84, which are secured by screws to an inner face on the end casting 45, and is similarly adjustable within the aperture 82 by means of set screws 85.

The horizontal plane in which lies the axis of the lower drum 40 is always parallel to the axis of the upper drum 39 irrespective of the distance between the two axes. To establish this relationship, a shaft 86 is mounted with one of its ends in a bearing in the bulkhead 43 through which it projects for a purpose to be later described, and at the other end in a bearing 86a (see Figure 40) in the end casting 45. This shaft 86 has secured rigidly to it two parallel arms 87 adjacent its respective ends, each arm being inset from the vertical plane of the adjacent drum end. The outer ends of these arms are bifurcated to provide open ended slots 88, which receive follower pins 89 rigidly carried by the slide plates 79 and 83 respectively. This mounting of the lower idler drum 40 insures true parallelism of the horizontal planes of the axes of the upper and lower drums, but permits adjustment of the lower drum position by means of the set screws 80 and 85 so that the vertical plane of its axis may be disposed at a slight angle to the vertical plane of the axis of the upper drum for a purpose which will now be explained.

The upper and lower drums are provided at their inner or left-hand ends with small record loop retaining end flanges 90 and 91 respectively. So that the record loop may be readily placed upon the drums and removed therefrom, no flanges are provided at the outer or right-hand ends of the drums. The recording and reproducing stylus, in embossing and following the record groove on the loop, tends to move the loop longitudinally toward the outer ends of the drums. To overcome this tendency and to insure a definite positioning of the loop with respect to the drums, the inner edge of the loop is held lightly in contact with the flanges 90 and 91 by so mounting the lower drum that its axis can be angled in a horizontal plane to establish greater tension in the loop at its inner end than exists at the outer end thereof.

This difference in tension results in the application of a horizontally acting force upon the loop in the direction of the flanges 90 and 91, and by a proper adjustment of the set screws 80 and 85 this force can be made just sufficient to hold the loop tightly in contact with the flanges. The slide plates 79 and 83 being free to move vertically in the guide blocks 81 and 84, the tension in the record loop is a function of the weight of the lower drum assembly.

The casting 46 (Figures 39 and 41) is a single integral piece of metal comprising a front bar 92, a rear bar 93, three upper tie bars 94, and three lower tie bars 95, the upper faces of the front and rear bars and the upper tie bars therebetween presenting a smoothly continuous arcuate shape to conform to the contour of the upper drum 39, and the lower faces of these front and rear bars 92 and 93 and of the lower tie bars 95 being similarly shaped to conform to the contour of the adjacent upper face of the lower drum 40.

The shaft 86, which was above referred to in connection with the description of the means for maintaining parallelism of the axes of the upper and lower drums, is disposed between the upper and lower tie bars 94 and 95 just inside of the front bar 92 (see Figure 6).

An outside face 96 of the rear bar 93 lies slightly inside of the vertical plane tangential to the faces of the drums (see Figure 6) and serves primarily to prevent inward buckling of the record as it moves endwise of the drums during the operations of removing it from and inserting it in the machine, thereby facilitating its passage without interference over a vertical rear face 97 of the casting 45. The outside face 96 of the rear bar 93 is formed with a channelled guide groove 98 for a purpose to be later described. The outermost face 99 of the front bar 92 is disposed somewhat outside of the vertical plane tangential to the faces of the two drums (see Figure 6), giving it a position with respect to the drums which insures contact therewith of the record loop when the loop is in position ready for operation.

A plate anvil 100 is screw-fastened to the front bar 92 with its outside face substantially in vertical alignment with the outermost face 99 and with its lower edge vertically spaced above the upper edge of the face 99 a sufficient distance to form a channel-shaped guide groove 101 similar to the guide groove 98 in the back face 96 of the casting 46. A relatively narrow upper strip 102 of the outside face of the anvil 100 serves as a backing for the record at that point in its path where it is in engagement with the stylus. For the balance of its width, the outside face of the anvil is occupied by a strip of felt 103 inlaid in the body of the anvil. The face of this strip of felt 103 projects very slightly beyond the faces 102 and 99 above and below it. As the loop engages this felt in its approach to the anvil 100, the felt has a dampening effect upon the record, eliminating any vibratory or undulatory motions therein and causing it to pass smoothly and quietly over the anvil.

It will be observed that the end casting 45 (see Figures 39 and 40) has a semi-circular upper face 105, a semi-circular lower face 106, parallel front and rear edge faces 107 and 97, and a vertical end face 104. The semi-circular faces 105 and 106 are aligned with the longitudinally adjacent cylindrical faces of the upper and lower drums 39 and 40, and the rear face 97 and front face 107 of the end casting are aligned with the vertical plane tangential to the drums, so that the end casting 45 acts as a guide when the record is slipped on or off the drums.

Referring to Figures 6 and 42, the lower drum is vertically movable with the slide plates 79 and 83, the movements of which are in unison by virtue of their connection to each other through the shaft 86. Elevation of the slide plate 79 and the slide plate 83, and with them the lower drum, is accomplished by elevation of a lift lever 108, one end of which is pivoted by means of a pin 109 to a lug 110 on the base plate 11, the other free end of which engages the lower face of the slide plate 79.

The lift lever 108 is raised by rotating in a clockwise direction a normally horizontal handle 114 rigidly associated with a shaft 113 pivotally mounted in two bracket arms 115 (see Figures 1 and 2) integrally projecting from the bulkhead 43. This shaft rigidly carries at its other end a cam 112 having a straight horizontal operative under face 116, one end 117 of which, when the handle 114 is depressed, presses downwardly upon one end 118 of a lever 119 which is pivotally mounted at a point between its ends upon one of the bracket arms 115. The other end 120 of this lever pulls upwardly on a lift link 111, the lower end of which is secured to the lift lever 108 at a point intermediate its ends.

When there is no record loop in position on the drums, the lower drum drops by its own weight to a position in which the slide plate 79 rests upon and is sustained by the lift lever 108 which normally is supported in the position shown in solid lines in Figure 6 by engagement of the end 118 of the lever 119 with the cam face 116. When the handle 114 is raised, the lower drum is raised to the upper position shown in dotted lines in Figure 6, in which position the two drums are close enough together to permit ready endwise movement of a record loop during its insertion upon or removal from the drums. If, after the record has been inserted in the machine upon the drums, the handle 114 is turned back to its normal position, dropping the lift lever 108 to the position shown in solid lines in Figure 6, the lower drum 40 drops until it reaches a position in which it is held suspended by the record loop.

Ejector-injector

The machine is so designed that when the handle 114 is elevated, the drum 40 is lifted to the upper limit of its range of movement during an initial arc of movement of the handle, and thereafter during movement of the handle through a subsequent arc the drum is held in its uppermost position, and at the same time an ejector mechanism is brought into play by which the record is shifted horizontally lengthwise of the two drums and the casting 46 and part way over the end casting 45 and through the opening 45a in the machine cover sufficiently to be readily grasped by the fingers of the operator for removal from the machine.

The same ejector mechanism, when operated in a reverse manner from its extended position by a return manipulation of the handle 114 in a counterclockwise direction, acts as an injector to move a record loop which has been placed upon it through the opening 45a into position upon the drums, after which a further complete movement of the handle 114 to its normal position will lower the drum 40 to the point where it is suspended by the record loop.

Figure 2:
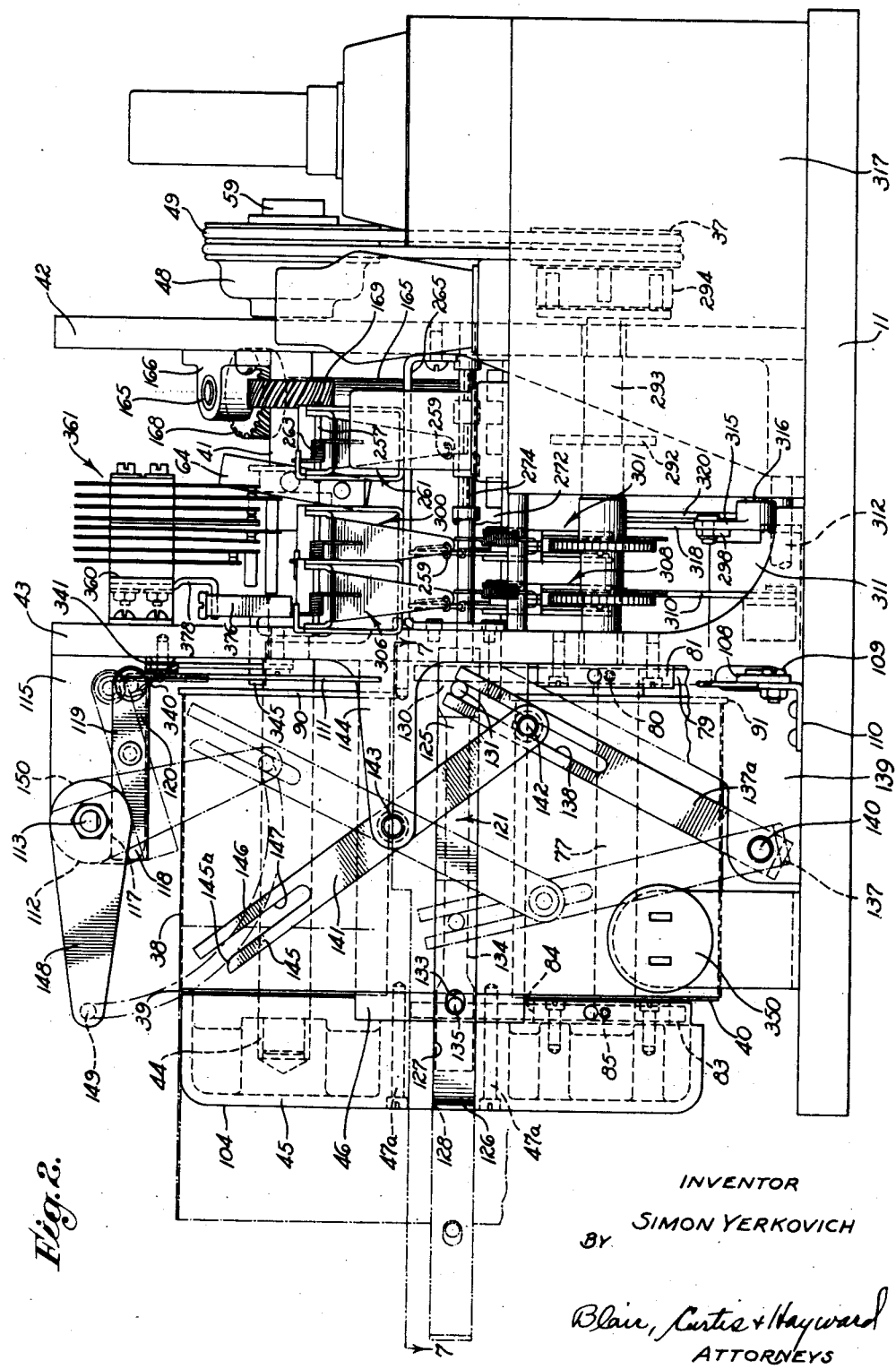
Figure 2 is a rear view of the machine with the cover entirely removed.
Figure 7:
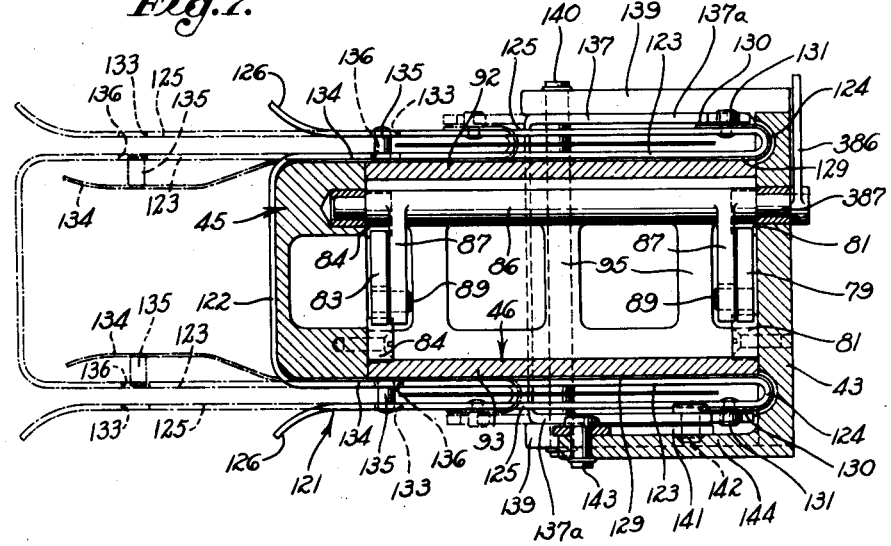
Figure 7 is a horizontal sectional view taken along the line 7—7 of Figure 2.

The construction and operation of this ejector mechanism can best be understood by reference to Figures 2, 6, and 7. The record loop is embraced along each vertical leg of its path of travel and in a horizontal plane substantially midway of the drums, as shown in Figure 7, by a W-shaped record shifting frame 121 formed from a metal strip to have an intermediate end bar 122, slide bars 123 extending rearwardly from the end bar at right angles thereto, curved cross bars 124 adapted to engage and push the two vertical legs of the record at their inner end edges, two record retaining bars 125 parallel to the slide bars 123, and two end portions 126 bent away from their adjacent slide bars 123 to facilitate smooth insertion of a record loop into the frame. The slide bars 123 are seated and movable in the guide grooves 98 and 101 in the horizontal casting 46 (see Figures 39, 40, and 41), and in channelled grooves 127 formed in the vertical front and rear faces 107 and 97 of the end casting 45 in alignment with the guide grooves 98 and 101.

When the record shifting frame 121 is in its extreme inner position, its end bar 122 is seated in a channelled recess 128 formed across the vertical end face 104 of the casting 45, a relationship which both fixes the inner limit of movement of the record shifting frame and obviates any projection of the record shifting frame from the end casting 45 or beyond the wall 13 of the cover 12. Each side of the record shifting frame is provided with a thin flat spring 129 lying against the inner guide engaging face of the slide bar 123. These springs are bent around the cross bar 124 to provide an extension 130 which, to prevent longitudinal displacement of the spring on the frame 121, is suitably secured to a pin 131 projecting laterally from the retaining bar 125. An outer end 134 of each of these springs, when the spring is free to assume the shape of its permanent set, occupies a position as shown in dotted lines in Figure 7 in which it is inset from its associated slide bar 123 a distance substantially equal to or slightly greater than the gap between the slide bar 123 and retaining bar 125. Each spring end 134 has a record pushing pin or lug 135 aligned with mating apertures 136 and 133 in the slide bars 123 and retaining bars 125 respectively.

When the frame 121 is moved inwardly from the position shown in dotted lines in Figure 7 to that shown in full lines in that figure, the spring ends 134 are moved outwardly by engagement with the bottom walls of the guide grooves 127 in the end casting 45, forcing the lugs 135 through the apertures 136 and seating the outer ends of the lugs 135 in the aligned apertures 133 in the retaining bars 125.

When the handle 114 is swung upwardly, the record shifting frame is moved outwardly to eject a record loop, and when the handle is returned to its normal position, the frame 121 is moved inwardly, the lugs 135 moving to positions in the apertures 136 and 133 just prior to their operative engagement with the outer end edges of the vertical legs of the record loop. The distance between the lugs 135 and the cross bars 124 is sufficiently greater than the width of the record loop that when the record is manually inserted in the frame with its inner edges in engagement with the cross bars 124, its outer end edges are spaced from the lugs 135 sufficiently to permit translation inwardly of the springs to that point of the travel of the frame 121 at which the lugs 135 are moved to position across the gap between the slide bars 123 and retaining bars 125, prior to the juncture at which the lugs 135 engage and push against the edges of the record.

The frame 121 is shifted back and forth by a set of motion transmitting members connected to the shaft 113 and its handle 114 comprising: first, a U-shaped bail 137 (see Figures 2, 6, and 7) pivotally mounted in bores 140 drilled in foot bracket extensions 139 of the bulkhead 43 and having upright arms 137a bifurcated at their upper ends to provide forks 138 the prongs of which laterally engage pins 131 projecting from the retaining bars 125; second, an intermediate lever 141 pivoted at 143 to a bulkhead bracket arm 144 and provided at its lower end with a pin 142 which slidably engages the prongs of the fork 138 of the rear bail arm 137a and is bifurcated at its upper end to provide a shorter prong 145 and a longer prong 146, providing a slot 147; and, third, a lever arm 148 (see also Figure 42) rigidly secured to the shaft 113 and extending therefrom in a direction diametrically opposite to that of the handle 114, this lever arm being provided with a pin 149, which when the lever arm is depressed travels in an arcuate path, shown in dotted lines in Figure 2, which causes it to enter and slidably engage the walls of the slot 147.

When the handle 114 is rotated in a clockwise direction by the operator, the first operative step which it effects is to lift the lower drum sufficiently to release the frictional grip of the record loop on the drum when the end 117 of the lower face 116 of the cam 112 contacts the end 118 of the lever 119, as has been previously described. As the lower drum is being lifted, the pin 149 is approaching the slot 147. By the time the pin engages a curved end 145a of the shorter prong 145 of the intermediate lever 141, a circular cam face 150 of the cam 112 has come into engagement with the end 118 of the lever 119, a cam relationship of these members which holds the lower drum stationary in its elevated position.

With the record loop loosened from the drums and free to be shifted laterally from the drums and from the machine, the pin 149 enters the slot 147, after which continued movement of the lever arm 148 rotates the intermediate lever 141, which in turn angularly shifts the bail 137 from its innermost or left-hand position, corresponding to the operative position of the record loop in the machine, to its outermost or right-hand position (shown in dotted lines in Figure 2) corresponding to the position of the record loop in which it is readily accessible for manual removal from the machine. In the operation of inserting a record loop, as the pin 149 leaves the slot 147 it slides over the curved surface 145a at the end of the shorter prong 145, giving the upper end of the intermediate lever 141 a final push which is transmitted to the bail and record shifting frame 121, seating the frame positively in its extreme inner position with all movable parts in proper position for operative use of the record loop.

*Carriage and feed*

A mount 211 for a recording and reproducing stylus 210 is secured to a carriage 151 (see Figures 1, 5, and 6), which is an aluminum casting having a longitudinal bore 152 by which it is slidably mounted upon a stationary shaft 153 secured in horizontal position between the bulkhead 42 and a frame standard 154 secured to the base plate 11. The shaft 153 is parallel to the shaft 41 and the axes of the drums 39 and 40. The carriage casting is formed with a depending arm 157 forked at its lower end to provide a front lug 158 and a rear lug 159, constituting a yoke arm disposed on either side of a slide rod 156 stationarily mounted on and between the standard 154 and bulkhead 42 in the same manner as shaft 153. A spring-urged button 160 seated in the front lug 158 bears upon the slide rod 156, holding the rear lug 159 tightly against the slide rod 156 and preventing angular movement of the carriage about the shaft 153 upon which the carriage is free to slide longitudinally in its traversing motion necessary to carry the stylus across the face of the moving record loop. Movement of the carriage on the shaft 153 is limited in a rightward direction by a rubber bumper 155a, and in a leftward direction by a rubber bumper 155b (see Figure 1). These bumpers are sleeved collars mounted on the shaft 153 in positions of end thrust engagement with the standard 154 and bulkhead 42 respectively.

A shaft 161 (see Figures 1 and 4) formed with a feed screw 162 is revolvably mounted on and between the standard 154 and bulkhead 42. At its left end (see Figure 4) it has fixed upon it a pinion 163 which engages a worm 164 on a diagonal shaft 165 rotatively mounted in bearings in upper and lower brackets 167 and 166 which are screw-fastened to the bulkhead 43. At the upper end of the diagonal shaft 165 is fixed a spiral gear 168 which permanently meshes with a spiral gear 169 on the shaft 41 (see Figures 2 and 4). It is apparent that whenever the shaft 41 is rotating, it has a permanent drive connection with the drum 39 and the feed-screw shaft 161.

Traverse of the carriage 151 is effected by engagement with the feed screw 162 of a segmental feed nut 170 (see Figures 5, 6, 20, 21, 22, and 25) which is integrally formed on the end of a feed nut bar 171 slidably mounted for projection to effect engagement of the feed screw and feed nut and retraction for disengagement thereof along lines perpendicular to the axis of the feed screw, on the under face of a plate 172 which is screw-fastened to the bottom of the carriage 151. The feed nut bar 171 is restrained from angular horizontal displacement by three pins 173, 174, and 175 (Figure 25) secured to and projecting downwardly from the plate 172, and is supported vertically against the under face of the plate 172 by an angularly movable plate lever 176 (Figures 23 and 24) pivotally mounted on a shouldered enlargement 177 of a pivot screw 178 which is threadedly secured at its upper end to the carriage 151 through an aperture in the plate 172. The plate lever 176 is free to be oscillated about the pivot screw 178 between a spacing washer 179 and a head 180 on the outer end of the pivot screw 178.

*Manual carriage shift*

The feed nut bar 171 may be retracted from position of engagement with the feed screw 162 by manually lifting a handle 181 (see Figures 5 and 6) integrally formed upon a casting 182 pivotally mounted upon the carriage 151 on a horizontal axis disposed longitudinally of the carriage. This casting has an integral downwardly extending arm 183 which projects below and to the rear of an upturned end 184 (see also Figure 22) of the feed nut bar 171 and in such a position relative thereto that when the handle 181 is elevated, the arm 183 engages the end 184 and pulls the feed nut bar toward the front of the machine. The feed nut bar 171 is resiliently urged toward its position of engagement with the feed screw 162 at all times by a coiled wire spring 186 (see Figure 25) which is mounted upon a pin 185 secured to the under side of the plate 172 and which is fastened at one end to a pin 199 secured to and projecting downwardly from the feed nut bar 171 and at its other end to the guide pin 175.

When the feed nut bar 171 is retracted against the action of the spring 186 by manual operation of the handle 181, the carriage may be traversed in either direction any desired distance between bumpers 155a and 155b by the manual application of lateral pressure to the handle 181.

*Back spacer*

It is at times desirable to backspace the carriage a predetermined short interval of traverse, or to establish a power backspace movement which may be stopped at any point under the control of the operator. For this purpose a backspacing mechanism, generally indicated by the numeral 188 (Figures 20 to 25), is provided on the under face of the carriage including a depending arm 187 formed on the plate lever 176, which arm, for each time it is actuated by a force exerted upon it by power means to be later described, retracts the feed nut bar 171 and backspaces the carriage, for a distance equal to the pitch of the screw thread, or to any multiple of that pitch for which the backspacing mechanism may be designed.

A pawl 190 having a tip 197 is mounted on a screw pivot 191 which is threadedly secured to the plate lever 176. This screw pivot has a head 200, an annular bearing surface 192 about which the pawl 190 is pivoted, and a circumferentially recessed pin 205 on its lower end. The plate lever 176 is resiliently loaded by means of a coiled wire spring 198 mounted in an annular recess 193 on pivot screw 178, one end of which is attached to the plate lever arm 187 and the other end of which is secured to the pin 175. This spring 198 holds the plate lever 176 in the position shown in Figures 20 and 25, in which the head 200 of the screw pivot 191 is held in contact with an end wall 201 of a recess 202 in plate 172. The pawl 190 is resiliently loaded to hold it in the position shown in Figure 25 with its tip 197 projecting beyond the plate lever 176 toward the feed screw 162 by means of a coiled wire spring 194 mounted on the end pin 205 of the pivot screw 191 and having one end secured about the recess 193 on the pivot screw 178 and the other end secured to a pin 195 carried by the pawl 190. This spring holds the pin 195 against a stop wall 196 on the plate lever 176.

When a force is applied to the plate lever arm 187 in the direction as shown by the arrows in Figures 20 and 25, the plate lever 176, and with it the pawl 190, is turned about the pivot screw 178 until the pawl tip 197 engages the feed screw 162 at a thread root. Prior to the time of this engagement, however, the feed nut bar 171 has been withdrawn from contact with the feed screw 162 by engagement of the wall 203 of a recess 204 on the plate lever 176 with the pin 199 carried by the feed nut bar. A continued movement of the plate lever arm 187 after the pawl tip 197 has established engagement with the feed screw 162 causes the pawl 190 to swing about the pivot screw 191, resulting in the application upon the pivot screw 178 by the plate lever 176 of a force having a vectral component parallel to the feed screw 162, a force which is obviously transmitted to the feed carriage, causing it to be traversed along the stationary shaft 153. This force results from the lengthening of the distance between the pawl tip 197 and pivot screw 178 as the pivot screw 191 approaches the straight line connecting these two points.

This backspace movement will cease when the pin 195 contacts a stop wall 206 formed on the plate lever 176, and within this maximum limit the backspacing movement may be regulated by control of the distance through which the plate lever arm 187 is moved. This distance is preferably such as to backspace the carriage a distance equal to the pitch of the feed screw 162 and is established in a manner to be explained later.

*Stylus head conditioner—Reproduction*

The machine herein described is of the type which embosses on a record a laterally undulating groove of constant depth. A stylus 210 is mounted at an acute angle with the approaching record in a stylus head 211 (Figure 11), which may be of any standard design suitable for receiving an electric current with alternations of an amplitude and frequency varying in accordance with the amplitude and frequency of sound waves and causing a mechanical lateral vibration of the stylus of an amplitude and frequency corresponding to the amplitude and frequency of the current alternations, and, vice versa, receiving the laterally undulatory vibrations of the stylus and electromagnetically generating an electric current in conductors leading from the head having alternations of amplitude and frequency corresponding to those of the stylus. Conductors 461 and 481 connect the stylus head 211 with a transducer 393 in a manner to be later set forth.

The machine employs the stylus 210 and stylus head 211 both for recording and reproducing sound. So that the stylus head may be capable of both of these functions, it must be so mounted upon the carriage 151 that its relationship to the carriage may be alternatively adjustable to either one of two conditions, a condition for recording in which the head is rigidly related to the carriage as respects motion in planes parallel to the record and is pressed relatively firmly toward the record in planes perpendicular thereto, and another condition suitable for reproducing in which the head is free to move relative to the carriage in planes parallel to the record, so that the stylus may be free to follow the lateral undulations of the record without deforming its side walls and in which at the same time it is pressed toward the record in planes normal thereto with a relatively light pressure to avoid such a deepening of the groove as will both ultimately cut through the record and will laterally restrain the needle so that it cannot follow the undulations of the grooves, but will rather deform them.

Figures 11 to 19 of the drawings depict the mounting of the stylus head on the carriage. The head is screw-fastened to a head trunnion plate 215 which is pivoted by means of depending trunnion arms 216 to a shaft 217 carried by a cradle 218. This mounting enables the head to oscillate on the carriage in vertical planes normal to the record 38. The cradle 218 by means of its arms 219 is in turn pivotally carried by a shaft 220 mounted in arms 221 and 222 of a conditioning trunnion 223 by which the cradle 218 and with it the stylus head 211 is made free to oscillate in planes parallel to the record. The conditioning trunnion 223 is rigidly secured by riveting to a conditioning bracket 224 with the base plate 225 of the conditioning trunnion 223 overlying the base plate 226 of the conditioning bracket 224. The conditioning bracket 224 is rigidly screw-fastened to the carriage 151. Since the conditioning bracket 224 and the conditioning trunnion 223 are both immovable with respect to the carriage and the shaft 220 is fixedly carried by the conditioning trunnion, it follows that the cradle 218 by means of the shaft 217 affords to the stylus head a pivotal support, the axis of which is capable of oscillation in planes parallel to the record, but is incapable of oscillation in planes normal thereto.

With the mounting as thus far described, the stylus head and stylus are free to both oscillate about the shaft 220 as an axis in following undulations of the record grooves and about the shaft 217 as an axis, both for establishing contact with the record and for disengagement therefrom, as shown in the dotted line and solid line positions of the head in Figure 11, and for giving effect to application of a light pressure upon the stylus to maintain contact with the record for reproducing purposes.

Stylus shift

Oscillation of the stylus head about the shaft 217 into and out of contact with the record 38 is accomplished in the following manner. The head trunnion plate 215 to which the stylus head is secured has a cam-shaped extension 227 the upper surface of which may be operated upon at any point in the traverse of the carriage by a cam operating rocker rod 228 carried between two rocker arms 230 pivoted on a frame shaft 231 secured to and between the bulkhead 42 and the standard 154 (Figure 1). When this cam operating rocker rod 228 is swung toward the stylus head, by means to be later explained, from the position shown in dotted lines in Figure 11, it engages and depresses the extension 227, swinging the stylus 210 away from the record loop 38.

Stylus head conditioner—Recording

For recording, the stylus head must be so mounted on the carriage that it and its supporting cradle 218 are incapable of oscillation in planes parallel to the record. The means for so conditioning the stylus head will be now considered. Journalled in ears 232 formed on the base plate 226 of the conditioning bracket 224 is a rocker shaft 233 which is a rocker shaft 233 which is a rocker shaft 233 which is a rocker shaft 233 which is a rocker shaft 233 which is a flat face 234 which is disposed horizontally on the upper side of the shaft when the stylus head is conditioned for reproducing. In this position, the under face of a base plate 235 of the cradle 218 is vertically spaced by a small clearance 236 (see Figures 14 and 15) from the flat face 234 of the rocker shaft 233, enabling the cradle and stylus head to oscillate through a very small angle about the shaft 220 which, however, is ample for the free movement of the stylus head and stylus as the stylus follows the lateral undulations of a groove in reproducing.

To eliminate this oscillatory play of the stylus head when it is being used for recording, provision is made for rocking the rocker shaft 233 to bring the end 237 of the flat face 234 and then the adjacent portion of the cylindrical surface of the rocker shaft 233 into contactual engagement with the under face of the base plate 235 of the cradle 218 from end to end thereof, holding the cradle against oscillation. The means provided consists of a conditioning control link 238 pivotally connected at its inner end to the end of an arm 239 secured to the end of the rocker shaft 233 and formed at its outer end to provide a vertical slotted recess 240 which embraces at any place in the traverse of the carriage 151 a conditioning rocker rod 241 carried by rocker arms 242 pivotally mounted on the frame shaft 231 (Figure 1). This rocker rod 241 is operated by the rocker arms 242 from a forward position in which the stylus head is conditioned for recording to a rear position in which it is conditioned for reproducing, and vice versa in a manner to be later described. The control link 238 is prevented from lateral displacement with respect to the conditioning bracket 224, which if it occurred would cause the sides of the slotted recess 240 to bind and grip the rocker rod 241 as the carriage was traversed, by an upstanding slotted guide 243 formed on the base plate 226, and is held against upward vertical swing about its connection with the arm 239 by an upper cross piece 244 of the guide 243.

To obtain the heavier pressure necessary for recording, a lever 245 pivotally mounted on a pin 246 carried by ears 247 on the arm 222 of the conditioning trunnion 223 is resiliently loaded for downward pressure at its rear end 248 by a coiled spring 251 mounted on the pin 246, connected at one end to the rear end of the lever 248, and anchored at the other end under the shaft 233. The forward end 249 of this lever contacts the under side of the cam-shaped extension 227 of the head trunnion 215, and brings to bear upon the stylus head a pressure sufficient for recording.

This pressure is eliminated when the head is conditioned for reproducing by a laterally offset lug 250 projecting from the arm 239. This lug, when the control link 238 is moved rearwardly, contacts the bottom edge of the lever 245 and lifts it against the action of the spring 251 to depress the lever end 249, relieving the stylus head from pressure toward the record. When thus conditioned for reproducing, the stylus head is held against the record by its weight alone, or, if desired, a light coiled spring 252 may be mounted upon the shaft 217 with one end seated against the base plate 235 of the cradle 218, and the other end seated upwardly against the under face of the trunnion plate 215.

Clutch actuators

When the machine is connected to a current source, the pulley 48 is being constantly rotated by the motor 15. The means for operating the clutch mechanism shown in Figure 9 to connect the pulley 48 to the shaft 41 for synchronously driving the upper drum 39 and the feed carriage 151 will next be described.

A relay 261 (Figure 4), electrically connected and arranged for control by the operator in a manner to be later described, is mounted on a shelf 265 secured at its respective ends to the two bulkheads 42 and 43. Its armature 258 is secured to the horizontal arm of a bell crank lever 262 pivotally mounted between standards 264 on the relay 261. The vertical arm of this bell crank lever 262 engages an end 259 (Figures 2 and 4), in the shape of a shepherd's crook, of a stiff wire drag link 260, the other bent end of which is pivotally secured to the upper end of a release lever 266. The bell crank lever 262 is held in normal position with its vertical arm in contact with frame parts of the relay 261 and with the armature 258 in elevated position, by a coiled spring 263 mounted on the pivot shaft 257 which carries the bell crank lever 262, one end of this spring being suitably anchored to one of the standards 264 and the other end bearing upon the vertical arm of the bell crank lever 262. When the armature 258 is drawn downward by the energized relay 261, the vertical arm of the bell crank lever 262 slides in the crook 259, strikes the end of the crook with a sudden impact, and during the remainder of its outward swing moves the drag link 260 and release lever 266.

This release lever is pivotally mounted between two side plates 268 and 269 (Figure 1) which form a two-sided bell crank lever 270 on a stationary shaft 267 (see also Figure 26) which is secured to and between the bulkheads 42 and 43 and upon which the bell crank lever 270 is also pivotally mounted. The release lever 266 is in lateral contact with the inner face of the plate 269 and is held away from the plate 268 by a spacing washer 271 on a sleeve on shaft 267.

The bell crank lever 270 is fixed longitudinally on the shaft 267 by a spacer bar 272 which extends the full distance between the bulkheads 42 and 43. This bar is secured to a stationary rod 274 mounted on and between the bulkheads 42 and 43 by integrally formed upper supporting fingers 273, the ends of which are hooked about the rod 274. The bar is also secured to the stationary shaft 267 by lower spacing fingers 275 hooked at the lower ends about the shaft 267. Two of these lower spacing fingers 275 are arranged to embrace and hold against lateral movement the two-sided bell crank lever 270.

When the upper end of the release lever 266 is pulled to the left by the action of the relay 261 (Figure 4), its movement is effected against resistance of a loading spring 256 coiled about the spacing washer 271 on the shaft 267 and arranged to bear at one end upon the upper end of the release lever 266 and anchored at the other end on horizontal leftward extending arms 278 of the plates 268 and 269. The lower arm 286 of the lever 266 is provided at its lower end with a catch hook 285 which is positioned to engage either one or the other of two detent pins 284 secured to a cam plate 282 in diametrically opposite positions equidistant from a shaft 281 mounted on and between vertical arms 279 of the plates 268 and 269 upon which the cam plate 282 is rotatably mounted.

The cam plate 282 has two toothed arcuate edges 283, the curved contours of which are symmetrically related with respect to the shaft 281, and eccentric with respect thereto. The cam plate is further provided with two diametrically oppositely positioned pins 289 equidistant from the shaft 281 arranged to alternately engage the lower end of a cam positioning lever 287.

This lever 287 is fixedly secured to a shaft 288 which is rotatably mounted between horizontal arms 295 of the two side plates 268 and 269 of the bell crank lever 270. The cam positioning lever 287 is spring loaded to apply a resilient pressure to the pin 289 by a coiled wire spring 291 coiled about the shaft 288 and arranged with one end bearing against the edge of the lever 287 and with its other end anchored to the underside of the arm 295 of the plate 268. The cam plate 282 mounted on the shaft 281 between the plates 268 and 269 of the bell crank lever 270 is suitably spaced from these plates on this shaft 281 to provide clearance between it and the plate 268 for movement in a vertical plane of the cam positioning lever 287 and clearance between this cam plate 282 and the plate 269 to provide for movement in a vertical plane of the lower arm 286 of the release lever 266.

When by means of a pull on the drag link 260 the detent pin 284 is disengaged from the catch hook 285 on the lower arm 286 of the release lever 266, the cam positioning lever 287 rotates the cam plate 282 in a clockwise direction, bringing the lower arcuate edge 283 into contact with a toothed wheel 292 rigidly mounted upon a shaft 293 journalled in bulkheads 42 and 43 and projecting a short distance through and beyond the bulkhead 42, where it is connected by means of a flexible felt coupling 294 to the shaft 36.

Since there is no break in the power transmitting connection between the motor 15 and the shaft 293, the toothed wheel 292 is always rotating with the motor 15. Consequently, when the cam plate 282 is brought into toothed relationship with the wheel 292, it is caused to rotate about the shaft 281, and due to the eccentric relationship of the toothed arcuate edge 283, the shaft 281 and the bell crank lever 270 which carries it are rotated in a counterclockwise direction about the shaft 267 against the action of a helical spring 276 anchored at its upper end to the rod 274 and attached at its lower end to a lug 277 formed by bending together in yokelike fashion the two leftward extending horizontal arms 278 of the plates 268 and 269 respectively. This spring normally holds the arm 278 against a stop rod 280 mounted on and between the bulkheads 42 and 43, normally positioning the bell crank lever 270 in the position shown in full lines in Figure 4.

During this counterclockwise movement of the bell crank lever, the lower pin 289 passes slidably downward along an edge 296 of the cam positioning lever 287 and beyond the lower tip thereof, which lever 287 then swings clockwise under the action of the spring 291 to a position (not shown) in which the upper pin 289 contacts the upper arcuate section of the edge 296 against which the pin 289 slidably moves, swinging the lever 287 counterclockwise and coming to rest against the lower straight-line portion of the edge 296 of the lever 287, where the lever 287 is held in its normal position (shown in Figure 4) by the pin 289, which in turn is held in its normal position by engagement of the upper one of the pins 284 with the catch hook 285 of the release lever 266.

During the rotational movement of the cam plate 282, the pull on the release lever by the drag link 260 has ceased due to deenergization of the relay 261 by means to be later described, allowing the lever to be swung by the spring 256 to a position of rest with its hook 285 against the shaft 281, where it remains until its rear edge 255 is contacted by the upper pin 284. The pin 284 then slides downwardly along the edge 255, coming to rest against the hook 285, at which juncture the lever 266 and cam plate 282 are returned to and held in their normal angular positions about their pivots ready for the next cycle of operations.

The bell crank lever 270 is rotated in a counterclockwise direction until the lower end of the toothed arcuate edge 283 is pushed upwardly by the toothed wheel 292 to a point where it no longer engages the teeth of the wheel 292, at which juncture the bell crank lever 270 is snapped back in a clockwise direction to its normal position, with one of two smooth contoured arcuate edges 297 of the plate 282 held in a position adjacent, conforming to, but out of contact with the toothed wheel 292, by contact of the lug 277 with the stop rod 280. It is thus apparent that upon energization of the relay 261, the cam mechanism operates from an initial position through a complete cycle back to normal position with all of its several parts ready for the next cycle of operation.

During the counterclockwise movement of the bell crank lever 270, its horizontal arm 295, which is pivotally connected at its outer end to the clutch-connecting push rod 75, as shown in Figure 9, elevates the push rod until at the lower end of the slotted opening 73 it engages the headed pin 71, shifting the yoke 64 to the right to couple the pulley 48 to the shaft 41 in the manner heretofore described.

By energization of a de-clutching relay 300 (see Figure 2) mounted on the shelf 265 alongside the clutch-connecting relay 261, the push rod 76 is elevated by an exactly similar cam mechanism designated as a whole by the numeral 301 to cause the push rod 76 to contact the headed pin 72 at the lower end of the slotted opening 74 to shift the clutch yoke 64 back to the position of clutch disengagement.

It will be noted that at the end of each of these clutch shifting operations, the push rod 75 or push rod 76, as the case may be, is snapped back to its inoperative normal position without affecting the position of the clutch yoke 64, when the associated bell crank lever 270 is snapped by the associated spring 276 to its normal position. The push rods 75 and 76 are each formed in two sections threadedly connected to provide for adjustment of their operative lengths.

Referring to Figure 26, a spring 302 carrying a detent button 303 is secured to the front arm of the bracket 67 in position to yieldably engage a corresponding button 304 formed by the riveted upset end of one of the follower lugs 65. This spring detent arrangement insures a positive positioning of the clutch yoke in one or the other of its two positions.

*Backspacer actuator*

A backspacing relay 306 (Figure 5) is mounted on a rearward extension 307 of the shelf 265 and operates the backspacing mechanism 188 (Figures 20 through 25) through a backspacer actuating cam mechanism, generally designated by the numeral 308, mounted on the shafts 267 and 293 adjacent the bulkhead 43 (Figure 2) and constructed similarly in all respects to the cam mechanisms already described for operation of the clutch. The horizontal arm 275c of the bell crank lever 270c (see also Figure 26) of the backspacer actuating cam mechanism 308 is pivotally connected at its outer edge to a depending link 310 which is in turn pivoted at its lower end to a rocker plate 311 oscillatably mounted on a stationary shaft 312 secured at its ends to the bulkhead 42 and standard 154 respectively.

During the cycle of operation of the backspacer actuating cam mechanism 308, the rocker plate 311 is tilted forward through a definite angle measured by the angular movement of the bell crank lever 270c, in the direction indicated by the arrow in Figure 26, after which it is snapped back to its normal position by the action of the coiled spring 276c of the cam mechanism 308. To protect the backspacer actuating cam mechanism 308 from the momentum of the rocker plate 311 as the cam mechanism is stopped on return to normal position, a felt cushioned stop 309 (Figure 6) is attached to the base plate 11 in position to simultaneously contact the rocker plate and bring it quietly to rest in position ready for its next actuation. During the latter part of its forward tilting movement, the rocker plate 311 contacts at any position of the carriage 151 the depending plate lever arm 187 of the backspacing mechanism 188, imparting to it a movement which will backspace the carriage in the manner already described a distance equal to the pitch of the feed screw 162.

The machine provides a single mechanical control for (I) the backspacing mechanism, (II) the clutch connecting actuator, and a plurality of mechanical controls for (III) conditioning the head for either recording or reproduction, (IV) shifting the stylus into and out of operative contact with the flexible record, and (V) shifting the clutch from a position of engagement to one of disengagement. These several controls will now be considered and described.

*Mechanical controls—(I) Backspacer*

(I) The backspacing mechanism 188 can be actuated solely by movement of the armature of the backspacing relay 306. If the armature is elevated by deenergization of its relay before completion of the cycle of movement of the backspacer actuating cam mechanism 308, the carriage will have a retrograde traverse the distance of the pitch of the feed screw 162. If, however, energization of the relay 306 is maintained, it will be apparent from reference to the description of the construction and operation of the cam mechanism by which the backspacer 188 is operated that the cam mechanism will automatically repeat and continue to repeat its cycle of operation, causing the carriage to be backspaced a corresponding number of unit increments until the relay is deenergized, bringing to an end the retrograde movement of the carriage.

If energization of the relay 306 is maintained until the carriage reaches the leftward limit of its traverse, the last cycle of movements of the backspacing mechanism 188 forces the carriage against the rubber bumper 155b, compressing the bumper and displacing its right-hand end to the left a distance longitudinally of the shaft 153 equal to the pitch of the feed screw 162. Since, however, the pawl 190 is disengaged from the feed screw 162, the bumper 155b in this time interval expands to its normal length, moving the carriage to the right the length of the pitch of the feed screw, in which position it is caught by the feed nut and from which position it is again backspaced a unit increment, the carriage alternating automatically between the two positions until the relay 306 is deenergized.

*Mechanical controls—(II) Clutch connecting actuator*

(II) The clutch mechanism shown in Figure 9 can be moved from its position of disengagement to one of engagement solely by a downward movement of the armature of the clutch connecting relay 261. As this relay is automatically deenergized in a manner to be later described, the cycle of operation of the cam mechanism which throws the clutch into position of engagement is self-terminating.

*Mechanical controls—(III) Conditioner*

(III) The stylus head conditioner is operable manually from either conditioning position to the other, and is operable automatically from the conditioning position for recording to that for reproduction by a downward movement of the armature of the backspacing relay.

(III-1) Manual shifting of the conditioning mechanism in either direction is accomplished by shifting longitudinally a bar 298 (Figures 5 and 26) which is slidably supported at its forward end in a vertical slot 313 formed in a foot bracket 314 fastened to the base plate 11 and which is supported at its rear end by a pivotal connection with an arm 315 of a switch shaft 316 mounted in an amplifier housing 317. This bar carries at its forward end a push button 319 which stops inward movement of the bar 298 by contact with the foot bracket 314.

A centrally pivoted lever 318 is mounted on a bracket standard 320 secured to the base plate 11. This lever is forked at its lower end for sliding engagement with a pin 321 on the bar 298 and is forked at its upper end for sliding engagement with a pin 322 on a horizontal, rearward, integrally formed, lower extension 323 of the leftward one of the two arms 242 which carry the rocker rod 241. When the button 319 at the end of the bar 298 is pushed rearwardly, the stylus head is conditioned for recording, and when this button is pulled forwardly, the stylus head is conditioned for reproduction.

(III-2) Automatic shifting of the conditioning mechanism to condition the stylus head for reproduction from a condition for recording by operation of the back-spacing relay is accomplished by an upward thrust of a lug 329 (Figures 26 and 27) formed integrally with and extending at right angles from a link 325 which is pivoted at its lower end to the outer end of a forwardly extending integral arm 326 of the link 310 against a horizontal arm 330 which extends rearwardly from and is integrally formed with the upper pivoted end of the rocker arm 242 which carries the left end of the conditioning rocker rod 241. The upper end of the link 325 is held in upright position by engagement of its upper slotted end with a pin 327 at the outer end of a rearwardly extending arm 328 which is an integral part of the leftward rocker arm 230 supporting one end of the rocker rod 228.

This interlock between the backspacing mechanism and the stylus head conditioning shift assures that at the end of the backspacing movement the machine will be adjusted for listening. If the stylus head is already conditioned for listening at the time the backspacing movement is effected, there is no interaction between the lug 329 and the arm 330 because the latter is then at the upper end of its range of movement beyond the reach of the lug 329, which in its upward travel does not contact the arm 330 except at the extreme upper limit thereof.

*Mechanical controls—(IV) Stylus shift*

(IV) As has been heretofore described, the stylus head and stylus are shifted toward and away from the record by movement of the rocker rod 228 which engages the upper surface of the cam-shaped extension 227 of the trunnion plate 215 to which the head is secured. The rocker rod is capable of being operated by four different agencies.

(IV-1) It is manually operable to withdraw the stylus head from the record engaging position shown in dotted lines on Figure 11 by an inward thrust applied to it by an upright lever arm 331 (Figure 6) integrally connected to the carriage shifting handle 181. The lever arm 331 engages the rocker rod 228 when the handle 181 is lifted and moves it forward sufficiently to clear the stylus from the record for manual traversing of the carriage, in advance of the time of contact between the casting arm 183 and the upturned end 184 of the feed nut bar by reason of a clearance space 337 which normally obtains between this casting arm and the upturned end of the feed nut bar.

This relationship of the parts insures lifting of the stylus from the record before it is possible to manually shift the carriage, obviating damage to the record during the carriage shift. Since there is no occasion for so doing, no provision is made for manually shifting the rocker rod 228 forwardly to bring the stylus into contact with the record, and since the rocker rod is not spring-loaded, it will remain in either of its two positions until acted upon by some external agency.

(IV-2) When the clutch is shifted from the "off" to the "on" position, the clutch operating mechanism automatically moves the rocker rod 228 forwardly to let the stylus down upon the record if it is not already in that position. Referring to Figure 26, this is accomplished as follows:

The clutch yoke operating lever arm 70 is formed with a forwardly offset lateral extension 332 carrying a pin 333 which is vertically adjustably secured in the vertically slotted end of the offset extension 332. The pin 333 projects through a slot 335 in a link 334 which is pivoted at its lower end to the arm 328 and the upper portion of which is held upright between the lever extension 332 and the head of the pin 333.

The ends of the slot 335 are so related to the range of movement of the lever extension 332 caused by the alternating upward shoves of the push rods 75 and 76 that when the cam-operating rocker rod 228 is in its rearward position corresponding to the withdrawn position of the stylus, the lower end of the slot 335 is engaged by the pin 333 when the clutch-connecting pusher rod 75 moves the pin 333 downwardly, the pin then causing the link 334 to be depressed and to swing the rocker arm 230 in a direction to move the cam-operating rocker rod 228 toward the front of the machine and move the stylus into contact with the record.

The several lever arms herein involved are so related that the clutch parts have made engagement and motion of the record loop has been established before the stylus point has contacted the record. Undesirable indentation of the record caused by dropping the stylus against it while stationary is thereby avoided.

With the cam rocker rod 228 in its forward position toward the front of the machine, the pin 333 will of course move idly in the slot 335 and make no change in the position of the stylus head. The upper end of the slot 335 is not contacted by the pin 333 when the clutch yoke is shifted to a position of disengagement by upward movement of the clutch disengaging pusher rod 76, the operation of disengaging the clutch having no effect on the position of the stylus with respect to the record, whether the stylus is or is not in operating position.

(IV-3) For obvious reasons, it is necessary when the backspacing mechanism 108 and its actuating cam mechanism 308 are being operated that the stylus be out of contact with the record. Accordingly, automatic interlocking means is provided for withdrawing the stylus. if it is not already in a withdrawn position when the back-spacing relay 306 is energized, in the engaging relationship of the lower end of a slot 336, formed in the upper end of the link 325 with a pin 327 carried by the rearward extending arm 328 of the rocker arm 230. When the backspacer actuating cam mechanism is set in motion, the forwardly extending arm 326 of the link 310 lifts the link 325, causing the lower end of the slot 336 to move the cam-operating rocker rod 228 rearwardly of the machine to withdraw the stylus from the record. If the stylus is already in its withdrawn position, it is obvious that the pin 327 is in an elevated position where it is not engaged by the lower end of the slot 336 until the link 325 reaches the upper limit of its range of movement. It is also obvious that downward movement of the link 325 has no action upon the cam-operating rocker rod 228.

(IV-4) There is one operational occasion when it is necessary that the stylus be withdrawn from the record loop. This occasion arises when a record loop is being removed from the machine, or a record loop is being inserted in the machine.

It will be remembered that the ejector-injector mechanism is operated by elevation of the handle 114, and also that during the first portion of the arc of movement of this handle for removing a record loop, the lower drum 40 is lifted sufficiently to loosen the frictional grip of the record loop upon the drums. It will also be remembered that with the record in position upon the drum the free moving end of the lift lever 108 travels upwardly for some distance prior to engaging the slide plate 79.

During this initial upward movement of the lift lever 108 and the corresponding movement of the handle 114, the lever 119, in addition to elevating the lift link 111, pulls upwardly on a flexible draw wire 340 (Figure 6) which passes around a pulley 341 mounted on the bulkhead 43 and extends horizontally and forwardly of the machine to a connection with the upright arm 342 of a bell crank lever 343, the forwardly horizontally extending arm 344 of which is disposed under a lug 345 (Figures 6 and 26) formed integrally with the link 334 and extending horizontally from the upper end thereof in a direction parallel to the traverse of the carriage.

These several parts are so dimensioned and related that the arm 344 engages the lug 345 prior to the engagement of the lift-lever 108 with the slide plate 79 and moves the lug 345 vertically upward, and with it the link 334, a sufficient distance to shift the cam-operating rocker rod 228 sufficiently to disengage the stylus from the record before the record is loosened by elevation of the lower drum 40, obviating scoring the record when it is subsequently shifted endwise over the drums.

It is, of course, obvious that if the stylus is already disengaged from the record, the lug 345 is in its elevated position during operation of the ejector mechanism and is not moved by the arm 344. A retrieving spring 346 (Figure 6) connects the outer end of the arm 344 with the stationary frame shaft 231 to withdraw the crank lever 343 to its normal position, and also to return the lever 119 (Figure 42) to its normal inoperative position with its end 118 held resiliently against the lower face 116 of the cam 112, a relative position which maintains the handle 114 in its initial horizontal position.

Since, as an automatic result of the ejecting movement of the ejector-injector mechanism, the stylus is always placed in its non-contacting position, no provision is made for withdrawing the stylus to inoperative position during the injecting movement when inserting a record in the machine.

*Mechanical controls—(V) Clutch disengaging actuator*

(V) There are three agencies by which the clutch yoke 64 may be shifted leftward to a position of clutch disengagement.

(V-1) One agency is the armature on the declutching relay 300 operating through the push rod 76.

(V-2) Another agency is the armature of the backspacing relay 306, which through the backspacer actuating cam mechanism 308 elevates the arm 326 (Figure 26), link 325, arm 328, and link 334, and through the pin 333 the forwardly offset extension 332 of the lever 70 which is rigidly related to the yoke 64. When thus angled in a counterclockwise direction, the lever 70 shifts the yoke to its position of clutch disengagement. It is obvious that by reason of the slots 336 and 335, if the clutch yoke is already in the leftward position of clutch disengagement, operation of the backspacer actuating cam mechanism has no effect on the position of the yoke.

At the beginning of the movement of the bell crank 270c of the backspacing cam mechanism, the pin 327 is seated in the lower end of the slot 336, and the pin 333 is seated in the lower end of the slot 335, if the drums are revolving and the stylus is in contact with the record. Before the rocker plate 311 contacts the plate lever arm 187 to operate the backspacing mechanism 188 on the carriage, the cam-operating rocker rod 228 has been caused to withdraw the stylus from the record, and the lever 70 has shifted the yoke 64 to a position of clutch disengagement.

Although these last two movements are initiated virtually simultaneously, the stylus has been disengaged from contact with the record in advance of the disengagement of the clutch, due to the longitudinal distance through which the clutch tooth 61 (Figure 9) must travel before it becomes disengaged from the teeth of the clutch jaw 54. Thus, in the power operation of the backspacer, we have a sequence of operation steps consisting of: first, the retraction of the stylus from the record and conditioning of the head for reproduction; second, the disengagement of the clutch; and third, the operation of the backspacing mechanism 188 on the carriage.

(V-3) The third agency by which the clutch may be disengaged is of a manual character, being the ejector operating handle 114. By the elevation of this handle at times when the clutch is in position of engagement, the arm 344 is elevated to contact and lift the lugs 345, which in turn angles the lever 70 to shift the clutch to the position of disengagement. As has been heretofore explained, this lifting movement also operates the cam-operating rocker rod 228 to withdraw the stylus from the record, but the pin 327 slides idly upward free from operative connection with the backspacing mechanism. Here again the sequence is such that the stylus breaks contact with the record while it is still moving, and immediately thereafter the clutch is disengaged and the record comes to rest.

*Electrical features*

In this machine the recording and reproducing channels are entirely electrical and the control of the machine is almost completely electrical. The electrical features whereby these results are accomplished will now be described:

The master wiring diagram of the entire machine, illustrated diagrammatically in Figure 43, shows the electrical interconnection of the various elements illustrated separately in the other drawings.

Electric circuit switches

Referring to Figure 6, a two-point plug connector 350 is suitably mounted on the base plate 11 for connection to a source of 110-volt alternating current. As shown in Figures 1 and 3, a two-position push button switch 351 is mounted on a bracket 352 secured to the base plate 11, and is adapted on one inward thrust of the button to connect lines 355 and 356 (see Figure 43) leading from the plug connector 350 to lines 357 and 358, respectively, leading to an amplifier 359 (Figure 43) within the amplifier housing 317, and on the next succeeding thrust of the button to break this connection. This push button switch 351 is disposed for protective purposes in a recess 353 (Figure 1) in the cover wall of the machine. A six-conductor transducer cable connector 354 (Figure 3) is also mounted on the bracket 352.

A switch-supporting bracket 360 (Figures 2 and 34) is mounted on the leftward wall of the bulkhead 43, and to it is screw-fastened a sequence leaf spring switch assembly 361 (Figures 2 and 34) comprising eight leaves, 362 to 369, inclusive, and a clutch-controlling leaf spring switch assembly 370 comprising switch leaves 371, 372, and 373 (Figures 1 and 34). The leaves of these two switches are mounted, spaced, and insulated by the usual insulating plates. Each of the leaves 362 to 369 of the switch assembly 361 and of the leaves 371 and 373 of the switch assembly 370 is provided with a contact secured to one face thereof and designated by a corresponding number followed by the suffix "a" (Figure 34), as shown in the drawing. The leaf 372 of the switch assembly 370 has secured to it two contacts, one on each of its faces, designated 372a and 372b.

The leaf 363 of the switch assembly 361 is provided at its lower extremity with a push rod 374 of insulating material extending horizontally to the right of the leaf, and which bears at its outer end against the left-hand face of the leaf 366. The leaf 366 is correspondingly provided with a push rod 375, the outer end of which separably rests against a depending arm 376 on a centrally pivoted, horizontally swinging lever 377. This lever is pivotally mounted upon and supported by a hanger 378 rigidly carried by the bracket 360. The other end of the lever 377 is seated in the vertically slotted upper end of a lever 380 which extends vertically downward for nearly the full length of the bulkhead 43 and is pivoted at its lower end on an axis transverse of the machine on a shouldered screw 380a. The end 379 of the lever 377 is bent downwardly to prevent disengagement of the lever 377 from the lever 380.

The lever 380 may be swung to the right, angling the lever 377 in a counterclockwise direction as viewed from above against the action of one or more of the leaves 362 to 369, inclusive, by a pull exerted by a stiff wire draw link 381 which is pivotally hooked around a pin 382 at a point intermediate the ends of the lever 380. This draw link 381 is bent at its outer end to provide a catch hook 385 for engagement with a lug 383 (see also Figures 1, 5, and 6) secured to the carriage 151, and projecting rearwardly therefrom toward the lower drum 40. The draw wire 381 is threaded through an eye 384 in the lug 383. The draw link 381 is made of such a length that as the carriage approaches the end of its traverse and is about to engage the rubber bumper 155a, the lug 383 engages the hook 385 on the end of the draw link 381, causing the arm 376 to move the push rods 374 and 375 to the left and make and break contact in a manner to be later set forth.

The leaf switch assembly 361 is also operated through the lever 380 by engagement of a lever arm 386, rigidly mounted on the projecting end 387 (see also Figure 42) of the shaft 86, with cam edges 388 and 389 formed on the lever 380. The arm 386 engages the cam edge 388, swinging the lever 380 to the right when the ejector mechanism is operated by the handle 114. The arm 386 engages the cam edge 389, similarly swinging the lever 380 to the right when with no record loop on the machine the lower drum 40 drops to its lowermost position. With the record loop on the machine and supporting the lower drum 40, the arm 386 does not contact either the cam edge 388 or the cam edge 389, but rests against an intermediate vertical cam edge 349.

The sequence of makes and breaks of the contacts 362a to 369a, inclusive, of the switch assembly 361 is as follows: Normally (see Figures 2 and 43), the contacts 366a and 367a are in make position, as are also the contacts 368a and 369a. The contacts of the contact pair 362a and 363a and of the contact pair 364a and 365a are in break position. As the push rods 374 and 375 are moved leftward, the sequence is as follows: make of 362a and 363a (Figures 35 and 43); break of 366a and 367a (Figure 36); make of 364a and 365a by pressure of the leaf 366 against an insulating leaf 390, and through the leaf 390 the switch leaf 365 (Figures 37 and 43); and break of contacts 368a and 369a by pressure of the depending arm 376 against a push rod 391 of insulating material, secured to the right side of the tip of the leaf 368 (Figures 38 and 43). When the lever 380 is actuated by the draw link 381, the arm 376 moves sufficiently to accomplish the first three steps of this sequence, but stops short of the point of breaking the contacts 368a and 369a, i. e., moves to the position shown in Figure 37. When the lever 380 is actuated by contact of the arm 386 with either of the cam edges 388 or 389, the depending arm 376 moves sufficiently to accomplish all four steps of the sequence, i. e., moves to the position shown in Figure 38.

The leaf 372 of the switch assembly 370 (Figure 1) has mounted on the left side of its tip end a push rod of insulating material 392. The contacts 371a and 372a are normally closed when the clutch yoke 64 is in its leftward position of clutch disengagement. As the clutch yoke 64 reaches a substantially vertical position, it contacts the push rod 392, breaking the contacts 372a and 371a and sequentially closing the contacts 372b and 373a. The switch assembly 370 is so mounted on the machine that the clutch yoke 64 strikes the push rod 392 in its rightward movement so that the circuit is closed between contacts 372b and 373a as the clutch is engaged.

Transducer

A transducer 393 is shown in Figures 8 and 28 to 33, inclusive. It is provided with a six-line cable 394 extending from the transducer to a six-conductor plug 395 adapted to engage the plug connector 354 in the end wall of the machine. This cable comprises a centrally disposed conductor 396 leading to a transducer device 397 and encompassed by a conductor shield (not shown) which serves as the ground return designated by the numeral 398 on the wiring diagram (shown in Figure 43), which is in turn surrounded within the cable by four conductors 399 to 402, inclusive.

The transducer housing consists of a transducer housing body 403 and a transducer housing cover plate 404. The transducer device 397, which may be of any appropriate construction for conversion of sound waves to electrical vibrations and vice versa, is mounted in an appropriate mouth piece cap 405 secured to the outer end of the body 403. The conductor 396 and a conductor branch of the ground return shield 398 are connected electrically to the transducer device.

A three-leaf clutch-operating switch assembly 406 and a two-leaf backspacer switch assembly 407 constructed in a manner similar to that already described in connection with the leaf switch assemblies 361 and 370 are secured to the bottom of the housing and on either side thereof.

Considering first the clutch-operating switch assembly 406, we have an upper leaf 408 connected with the conductor 399 and having a contact 408a, a leaf 409 connected to a branch of the ground conductor 398 and having contacts 409a and 409b on its upper and lower sides respectively, and a leaf 410 connected to the conductor 400 and having a contact 410a. The leaves are disposed normally with the contacts 409b and 408a in make position, and 409a and 410a in break position.

In the switch assembly 407 we have a leaf 411 connected to a branch of the ground wire 398 and provided with a contact 411a, and a leaf 412 connected to the conductor 401 and having a contact 412a, the leaves being normally disposed with the contacts in break position. Leaves 409 and 411 are extended beyond the other leaves and carry small push rods 413 and 414, respectively.

Manual push buttons 415 and 416, which project through apertures in the housing cover 404 in convenient position for manual operation, are screw-fastened to horizontal flanges formed on the movable end of switch levers 417 and 418, respectively, which are pivotally mounted at their other ends on stationary vertically disposed framing plates 430 and 431 secured to the housing body 403. These framing plates 430 and 431 are spaced apart by a spacing pin 432 adjacent the pivot mountings of the switch levers 417 and 418 and by a spacer block 426 at their ends adjacent the movable ends of the switch levers. The spacer block 426 has formed integrally with it at its end toward the transducing device 397 two flanged wings 423 and 424 which act as power limit stops for the push buttons 415 and 416.

Mounted slidably in a horizontal bore in the spacing block 426 and in registering bores in the framing plates 430 and 431 is an interlocking pin 425, conically tapered at both ends, which is slidably shiftable to alternately engage conical-shaped recesses in the switch levers 417 and 418 in such a manner that when either switch button 415 or switch button 416 is depressed, the interlocking pin 425 is shifted to a position permitting downward movement of the associated one of the switch levers 417 and 418 and preventing downward movement of the other of the levers until the push button of the one lever is returned to normal position. As a result of this relationship, only one of the push buttons 415 and 416 can be depressed at a time.

The switch levers 417 and 418 are prevented from outward lateral displacement by engagement of their movable ends with suitably disposed vertical faces on the button stops 423 and 424. Horizontally disposed lug pins 419 and 420 are attached to the switch levers 417 and 418, projecting outwardly therefrom in position to engage the push rods 413 and 414, respectively.

A warning lamp 427 is secured to the under side of a bracket 433, which is screw-fastened to the switch assembly 406. One terminal of this lamp is connected to the wire 402 and the other is grounded in the usual manner and thereby connected to the ground wire 398. A Lucite cylinder 428 is mounted in the housing body in horizontal alignment with the lamp 427, with its outer end projecting through the housing wall and formed on the lower side of the projecting end with a beveled surface 429 which reflects a beam of light in a direction perpendicular to the axis of the transducer readily visible by the operator. Tension in the leaf springs of the switch assemblies 406 and 407 return the push buttons to normal position.

Electrical wiring

On the wiring diagram (Figure 43) are shown diagrammatically, with their parts numbered as in the preceding structural description, the transducer 393, transducer connecting cable 394, transducer connecting cable plug 395, transducer connecting receptacle 354, clutch connecting relay 261, clutch disengaging relay 300, backspacing relay 306, clutch control switch assembly 370, backspacing switch assembly 361, stylus head 211, power connector 350, power switch 351, the conductors 356 and 355 connecting the connector 350 and switch 351, conductors 357 and 358 connecting the switch 351 to the amplifier 359, stylus conditioning shift, and amplifier switch bar 298 with its push button 319 and switch arm 315. In addition, there are shown an indicator lamp 450 mounted on the machine in view of the operator (Figure 8), a warning lamp switch 451, and amplifier recording-reproducing shift switches 452 and 453, the latter three switches being mounted within the amplifier housing 317.

In the amplifier housing 317 is a transformer connected across the 110-volt power supply line connected to the amplifier 359 through the conductors 357 and 358 to provide a 6.3-volt and an 11-volt power source in the machine, the former for operation of the lamps 450 and 427 and the latter for operation of the three relays 261, 300, and 306. It is, of course, apparent that the machine is shown and described as adapted for an available supply of 110-volt alternating current merely for purposes of illustration. The machine may be adapted by means within the skill of those versed in the art to alternating current of other voltages or to direct current. The amplifier housing 317 is indicated on Figure 43 by a space enclosed by dash lines.

The power side of the 6.3-volt or lamp circuit leaves the amplifier housing by a conductor 474, and the power side of the 11-volt or relay circuit leaves the amplifier housing by a conductor 463. The common grounded side of these two circuits comprises a set of connected conductors which are all designated by the numeral 398 and shown in Figure 43. Arrow marks are placed on the lines representing the conductors of both sides of the lamp circuit and the relay circuit pointed in the direction of decreasing potential, i. e., away from the power source and toward the ground connection.

The amplifier input side of a signalling audio-frequency circuit is represented by a conductor 457 leading into the amplifier, and the power output side of the amplifier audio-frequency circuit is represented by the conductor 458 leading out from the amplifier 359. These circuits are grounded at 480. The stylus head 211 is grounded at 481, and the transducer device 397 is grounded to the wire 398.

The switch 453 is arranged to connect the conductor 457 of the audio-frequency circuit leading into the amplifier either to the stylus head by conductors 460 and 461 or to the transducer device 397 by conductors 456, 454, and 396. The switch 452 is arranged to connect either the stylus head by conductors 461 and 459 or the transducer device by conductors 396, 454, and 455 to the amplifier output audio-frequency circuit conductor 458 leading from the amplifier. Small arrows on the conductors connecting the transducing device and the stylus head with the amplifier are pointed in the direction of decreasing potential of a signalling audio-frequency current, and longer arrow marks on these conductors indicate the direction of decreasing potential of the amplified audio-frequency current.

The electrical connections of the conductors of the lamp and relay circuits to the indicator lamp 450, relays 261, 300, and 306, transducer switch 406 and 407, and switch assemblies 361 and 370 are as shown on Figure 43. Their detailed character will be apparent from a reading of the following description of the operation of the machine.

*Operation*

It will be assumed that initially the machine is disconnected from a power source, that no record is in place upon the drums, that the dictate button 319 is in its forward or reproducing position, and that the carriage is at the right-hand end of its traverse. Under these conditions the lamps 450 and 427 are dark, the switches 451, 452, and 453 are in their upper solid line positions as shown on Figure 43, the arm 376 is in its extreme left-hand position as shown in Figure 38, due to contact of the arm 386 with the cam edge 389 (see Figure 34), in which position the main power side of the relay circuit is interrupted by separation of the contacts 368a and 369a, and the remaining leaves of this switch assembly occupy the position shown in Figure 38 of the drawings, the clutch yoke 64 is in its left-hand position, the clutch control assembly 370 has its leaves in the position shown in Figure 43 of the drawings, the stylus head is conditioned for reproducing by virtue of the position of the button 319 (see Figures 5 and 26), and the stylus is in its withdrawn position because the lug 345 is held in its elevated position by the arm 343 (see Figure 6).

The transducer plug 395 is inserted in the transducer plug socket 354, a power connected plug is inserted in the connector 350, and the switch 351 pushed to the "on" position. The motor 15 then rotates and current flows through the conductors 474 and 482 to the indicator lamp 450 and returns to ground by the conductors 483 and 398, illuminating the lamp. Current also flows in the lamp circuit through the conductors 474 and 476, switch 451, conductors 477, 475, and 482, through the lamp 427 in the transducer to the ground conductor 398, illuminating the warning lamp 427, indicating that the machine is electrically connected for reproduction. Since, as will be seen by reference to Figure 38, the contact buttons 362a and 363a are closed, current may also flow to the lamp through the conductor 474, switch leaves 363 and 362, and conductors 475 and 482. The machine is otherwise dead as the break between the contacts 368a and 369a prevents operation of the clutch connecting relay 261 for rotating the upper drum and feed screw and operation of the relay 306 to power backspace the carriage.

The handle 114 is now lifted to elevate the lower drum 40 and throw the ejector frame 121 to the right, as shown in dotted lines in Figure 7, in position for placement of a record loop. The cam-operating arm 386 (see Figure 34) is thereby moved from contact with the cam edge 389 to the cam edge 388, which leaves the switch assembly 361 in unchanged condition so that the machine is still dead except for the indicator lamp 450 and the warning lamp 427.

An endless flexible record loop 38 is now inserted in the record shifting frame 121 through the opening 45a of the cover (Figure 8), care being taken to push the record inward until its inner edge engages the curved cross bars 124 at the inner end of the record shifting frame 121 (Figure 7). The lever 114 is then manually returned to its normal horizontal leftward position, a movement which first shifts the record loop into operative position on the drums and thereafter simultaneously effects three actions. It lowers the drum 40 to an intermediate vertical position in which it is supported by the record loop; it moves the arm 386 (Figure 34) upward into contact with the intermediate cam edge 349, placing the switch assembly 361 in the position shown in Figures 2 and 43 of the drawings; and it permits the retrieving spring 346 (Figure 6) to lower the arm 344 out of contact with the lug 345, which leaves the link 334 (Figure 26) free to operate the stylus shift to record engaging position and at the same time to restore the lift lever 108 to its lowermost position shown in full lines in Figure 6, and to restore the record ejector handle 114 to its initial position (see Figure 42).

The switch 361 has, during the movement of the arm 386 from the cam edge 388 to the intermediate cam edge 349, been moved by the flexure stress of its leaves from the position shown in Figure 38, sequentially through the positions shown in Figures 37, 36, and 35 to the position shown in Figure 43. At the position shown in Figure 37, the sequence contacts 368a and 369a close the relay circuit. The closed contacts 364a and 365a are then effective to operate the backspacer actuating cam mechanism through one cycle only, backspacing the carriage one unit increment because the contacts 364a and 365a are almost immediately thereafter broken, as shown in Figure 36, preventing repetition of the cycle. This backspacing is incidental only and results from a sequence characteristic of this switch adapted to cause a backspacing movement at the end of the rightward carriage traverse, as will be later explained. In the position shown in Figure 35, the contacts 366a and 367a of the clutch-connecting relay circuit are closed, and thereafter, as illustrated in Figure 43, the contacts 362a and 363a of the warning lamp circuit are open, although the warning lamp 427 is still illuminated by current flowing through the switch 451.

The carriage is now shifted to its extreme leftward position. This may be done manually by lifting the handle 181 which disengages the feed nut from the feed screw but does not withdraw the stylus from the record loop, since it is already in the withdrawn position. Leftward pressure on the handle moves the carriage until it contacts the left rubber bumper 155b.

The machine can be power-shifted by depressing the button 416 on the transducer, Figures 31 and 32, which closes the contacts 412a and 411a (see Figure 43) and at the same time shifts the interlocking pin 425 (see Figure 32) to prevent operation of the clutch engaging button 415. Referring to Figure 43, the circuit is now closed through the backspace relay 306 over the conductors 463, closed contacts 369a and 368a, conductors 464, 465, and 466, closed contacts 412a and 411a to ground 398. The backspacer actuating cam mechanism 308 operates the backspacing mechanism 188 and in so doing lifts the link 310 (Figure 26) which, however, has no effect on the stylus shift or the stylus head conditioning mechanism, as the arm 330 and the arm 328 are already in their upper positions.

Since the link 334 is already in its upper position, as it always is when the stylus is in withdrawn position, the clutch yoke is locked in its position of disengagement by the seating of the pin 327 in the slot 336 and the seating of the pin 333 in the slot 335. By holding the button 416 of the transducer down, the backspacing cycle is repeated until the carriage contacts the left rubber bumper 155b. The machine is now ready for dictation.

The bar 298 is shoved inward by pressure on the button 319, opening the switch 451 in the warning lamp circuit, darkening the lamp 427, and shifting the switches 452 and 453 to the position shown in dotted lines on Figure 43. Inward movement of the bar 298 also shifts the lever 318, which through the rocker rod 241 conditions the stylus head for recording and lowers the arm 330 into contact with the lug 329.

Just before dictation is begun, the button 415 of the transducer is depressed (Figure 32), which shifts the interlocking pin 425 to its leftward position, locking the backspace button 416 against movement. The clutch-connecting button 415 is manually held in its depressed position against the spring action of the leaves 409 and 410, the contacts 409a and 410a of which are now closed, completing the electric circuit of the clutch-connecting relay 261, through the conductor 463, the closed contacts 368a and 369a, the conductors 464 and 468, the closed contacts 371a and 372a of the switch assembly 370, the conductors 469 and 470, the closed contacts 367a and 366a, the conductors 471 and 400, the closed contacts 409a and 410a to ground 398.

The clutch-connecting cam mechanism then shifts the clutch yoke to connect the clutch to rotate the upper drum 39 to move the record loop 38 in its path of travel about the two drums and starts the rotation of the feed screw 162 to cause the carriage 151 and therefore the recorder-reproducer unit 211 to begin its traverse of the record loop. The clutch yoke 64 in its shift contacts the push rod 392 of the clutch assembly switch 370, opening the contacts 371a and 372a, and closing the contacts 372b and 373a, preparing the clutch disengaging relay circuit for completion by elevation of the button 415 of the transducer. The extension 332 (Figure 26) of the clutch yoke lever 70 is depressed, lowering the link 334 and bringing its lug 345 in contact with the arm 343 of the bell crank lever 342. Depression of the link 334 also operates the rocker rod 226 to drop the stylus on the now moving record and seats the pin 327 in the lower end of the slot 336.

Now dictation into the transducer device 397 sets up an audio-frequency signal current over the conductors 396, 454, and 456, the switch 453, and the conductor 457 to the amplifier 359, where the audio-frequency current is amplified which, by the conductors 458, switch 452, and the conductors 459 and 461, is transmitted to the stylus head 211 where a corresponding record groove is made in the record loop.

During each pause of the dictation, a release of manual pressure on the button 415 allows it to be elevated to its normal position opening the contacts 409a and 410a and closing the contacts 408a and 409b which now close the circuit from the contact 373a (which contact, it will be remembered, is closed with the contact 372b by reason of the pressure of the yoke 64 on the push rod 392) through the conductor 472, the clutch disengaging relay 300, the conductors 473 and 399, closed contacts 408a and 409b to ground 398. The clutch disengaging actuator cam mechanism 301 now operates through one cycle to shift the clutch yoke 64 leftward, disengaging the clutch and permitting the clutch control switch assembly 370 to assume its initial position, shown in Figure 43, to which it is restored by the flexure stress of its leaves. In this position the contacts 371a and 372a are again closed ready for the next depression of the button 415. As the link 334 (Figure 26) is in its lower position, the pin 333 idly rides upward in the groove 335 as the clutch yoke is shifted leftward.

If at any time it is desired to cease dictation and listen to any portion of the record, the transducer push button 415 is elevated, which places the clutch in a position of disengagement. Backspacing may then be accomplished manually by lifting the handle 181, which disengages the feed nut and withdraws the stylus from the record, the withdrawal operation elevating the pin 327 in the groove 336 and seating the pin 333 in the bottom of the groove 335. After shifting the carriage to the desired point of its traverse, the handle 181 is lowered, engaging the feed nut with the carriage feed screw. If now the operator should press upon the transducer button 415, the clutch yoke will be shifted to "on" position, the link 334 will be lowered, placing the stylus upon the record; but as the stylus head is positioned for recording and the push button 319 and therefore the bar 298 are in their inner positions, maintaining the switches 452 and 453 in position for recording, no sound waves will emanate from the transducer device 397. Accordingly, it is necessary, before pressing down upon the clutch operating button 415, to pull the bar 298 to its forward position, which closes the switch 451, illuminating the warning lamp 427, warning the operator not to dictate in this position of the bar 298, and causes the switches 452 and 453 to assume their reproducing position shown in solid lines on Figure 43. Shifting the bar 298 forward also operates the rocker bar 241 to condition the stylus head for reproduction.

Instead of manually backspacing the machine, it may be both backspaced and placed in position for reproducing by depressing the backspace button 416 of the transducer, and maintaining the button in its depressed position until the carriage has assumed the desired leftward position. Depression of the button 416 closes the contacts 412a and 411a, operating the backspacer actuating cam mechanism to backspace the carriage any desired number of unit increments and at the same time to elevate the link 310 (Figure 26) and its arm 326, causing the lug 329 on the link 325 to lift the arm 330, operating the rocker rod 241 to condition the stylus head for reproducing and causing the lower end of the groove 336 to lift the pin 327, operating the rocker rod 228 to remove the stylus from the record for freedom of retrograde traverse of the carriage.

When the clutch yoke is now shifted to the right to its clutch-connecting position, the link 334 is lowered, operating the rocker rod 228 to place the stylus on the record, the clutch having established motion in the record before the stylus point contacts it. The record groove of the record loop now sets up in the stylus head on audio-frequency signal current which is transmitted over the conductors 461 and 460, the switch 453, and the conductor 457 to the amplifier, where an amplified audio-frequency current is set up which is transmitted by the conductor 458, switch 452, conductors 455, 454, and 396 to the transducer device, where it is converted into corresponding sound waves.

At the conclusion of the desired reproduction, the bar 298 is shifted to recording position by means of knob 319, and shifting of the clutch again puts in motion the record loop ready for dictation by the operator.

It is to be noted that at the end of each single cycle of movement of the backspacer actuating cam mechanism, the link 325 and its lug 329 are held positively in their initial normal position and are unaffected by shifting of either the conditioning rod 241 or the stylus shifting rocker rod 228.

As the carriage approaches the rightward limit of its traverse, whether conditioned for recording or reproduction, provision is made for an automatic warning to the operator and a cessation of movement of the carriage to the right. The lug 383 on the carriage (Figures 6 and 34) engages the bent end 385 of the draw link 381, pulling the lever 380 to the right, which operates the limit backspacing switch assembly 361. As the switch operates, it first assumes the position shown in Figure 35 in which, if the machine is adjusted for recording, the warning lamp 427 is illuminated. If the machine is conditioned for reproduction, the lamp is already illuminated and remains so. As shown in Figure 36, the contacts 366a and 367a are broken, preventing subsequent operation of the clutch engaging relay 261. Then the contacts 364a and 365a are closed, as shown in Figure 37, which energizes the backspacing relay 306, which, through the backspacer actuating cam mechanism (1) elevates the arm 326 of the link 310 (a) to remove the stylus from the record, (b) to condition the head and amplifier for reproduction if they are not already so conditioned, and (c) to shift the clutch yoke to the left, disengaging the clutch; and concurrently (2) operates the backspacing mechanism 188 to move the carriage backward one unit increment.

As the carriage travels backward, the contacts 364a and 365a are again opened by leftward movement of the lever 380, stopping the backspace drive, and the contacts 366a and 367a are closed, completing the circuit to the clutch-connecting relay by way of the contacts 409a and 410a so that as long as the button 415 is held depressed, the carriage will continue to reciprocate from its rightward limit of traverse to a point a short distance to the left therefrom and back again to its rightward limit until the button 415 is elevated, when rightward movement will be prevented, bringing the carriage to a stop. During this reciprocation, the warning lamp 427 remains illuminated, signalling to the operator that the end of the record has been reached.

To remove the record at the completion of the dictation, the handle 114 is elevated, shifting the record holding frame to the right, causing the arm 343 through the lug 345 to insure disengagement of the clutch and to lift the stylus point from the record, and at the same time causing the arm 386 to engage the cam edge 388, moving the switch assembly 361 to its extreme position in which the contacts 368a and 369a are opened, as in Figure 38, making it impossible to energize any of the three relays 261, 300, or 306.

After the record has been removed, another one may be inserted and the operation already described repeated, or the drum 40 may be dropped to its lowermost position in which the arm 386 engages the cam edge 389, moving the switch assembly 361 to its extreme position in which again it is impossible to energize the relay circuit.

To illustrate the invention, a machine has been shown and described in which a record groove of the laterally undulating type is electromechanically embossed by a stylus of the embossing type on an endless record loop of thin flexible material. While some of the features of the invention herein claimed are restricted in their use to a machine of this character, other features of the invention herein claimed are applicable to machines adapted for use with records of either the cylinder or disc type, to machines making a groove of the hill-and-dale type, to machines employing for recording a cutting stylus, to machines having acoustically connected styli, or to machines having any combination of these characteristics.

I claim:

1. In an apparatus for translating vibrations between a record medium and a vibratable medium, the combination of, a stylus, a traversable carriage for said stylus, a first revolvable drum mounted with its axis parallel to said traverse direction, a second revolvable drum mounted with its axis in parallelism to said first drum, said drums being relatively movable, means providing a force flexibly urging said drums apart, said drums being disposed to carry a flexible endless loop record element under tension in a path at one point of which it has sliding contact with said stylus, power means for rotating at least one of said drums and traversing said carriage, and an elongated anvil mounted parallel to and between said drums and at said point to provide at all times the support for said flexible record element at the point on its surface on which said stylus operates in transmitting vibrations between said record element and said translating device.

2. In an apparatus for translating vibrations between a record medium and a vibratable medium, the combination of, a stylus, a traversable carriage for said stylus, a first revolvable drum mounted with its axis parallel to said traverse direction, a second revolvable drum mounted with its axis in parallelism to said first drum, said drums being relatively movable, means providing a force flexibly urging said drums apart, said drums being disposed to carry a flexible endless loop record element under tension in a path at one transverse line of which it has sliding contact with said stylus, power means for rotating at least one of said drums and for traversing said carriage, and an elongated anvil mounted parallel to and between said drums and at said transverse line and outwardly displaced with respect to a plane tangential to said drums to provide at all times the support for said flexible record element at the point on its surface on which said stylus operates in transmitting vibrations between said record element and said translating device.

3. In an apparatus for translating vibrations between a record medium and a vibratable medium, supporting means for an endless record loop comprising a frame, an upper drum revolvably mounted in bearing means stationarily carried by said frame, a lower drum revolvably carried by movable bearing means, a shaft oscillatably mounted in said frame parallel to said drums and therebetween, parallel arms rigidly mounted on the ends of said shaft respectively, suspending means of equal length between said arms and the ends of said movable bearing means for maintaining parallelism of said drums, and power means for rotating said upper drum.

4. In an apparatus for translating vibrations between a record medium and a vibratable medium, supporting means for an endless record loop comprising a frame, an upper drum revolvably mounted in bearing means stationarily carried by said frame, a lower drum revolvably carried by movable bearing means, means mounted in said frame for vertically movably supporting said movable bearing means in parallelism with said stationary bearing means, power means for rotating said upper drum, and means for slightly shifting the point of support of one end of said movable bearing means by said vertically movable supporting means to slightly increase the center distance of said one end of said movable bearing means from the upper drum bearing means with respect to the center distance of the other end of said movable bearing means from the upper drum bearing means.

5. In an apparatus for translating vibrations between a record medium and a vibratable medium, the combination of, a stylus, a traversable carriage for said stylus, a first revolvable drum mounted with its axis stationary and parallel to said traverse direction, a second revolvable drum mounted with its axis movable in parallelism to said first drum, means providing a force yieldingly urging said drums apart, said drums being disposed to carry a flexible endless loop record in tension in a path at one transverse line of which it has sliding contact with said stylus, power means for rotating at least one of said drums and for traversing said carriage, an elongated anvil mounted parallel to and between said drums and along said transverse line to provide at all times the support for said flexible record element at the point on its surface on which said stylus operates in transmitting vibrations between said record element and said translating device, and an elongated strip of vibration-deadening material mounted in said path parallel to and immediately in advance of said anvil.

6. In apparatus for translating vibrations between a record medium and a vibratable medium, the combination of, record supporting means for removably positioning a flexible loop record element in a manner permitting movement of said element in a given path in cooperative relationship with a translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, driving means for moving said record supporting means to move said element in said given path, and control means for said driving means operatively associated with said adjusting means and automatically actuated by the operation thereof to record element releasing position for rendering said driving means inoperative.

7. In apparatus for translating vibrations between a record medium and a vibratable medium, the combination of, record supporting means for removably positioning a flexible loop record element in a manner permitting movement of said element in a given path in cooperative relationship with a translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, driving means for said record supporting means to move said element in said given path including a clutch, power means associated with said clutch for supplying the power to engage said clutch, means for locking said power means against operation, and control means operatively associated with said adjusting means and automatically actuated by the operation thereof to record element release position for disengaging said clutch and actuating said locking means.

8. In apparatus for translating vibrations between a record medium and a vibratable medium, the combination of, a translating device, record supporting means for removably positioning a flexible loop record element in a manner permitting movement of said element in a given path in cooperative relationship with said translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, conditioning means associated with said translating device for moving it into and out of a position of cooperative relationship with said record element, and control means for said conditioning means operatively associated with said adjusting means and automatically actuated by the operation thereof to record element release position for operating said conditioning means to move said translating device to non-cooperative position with respect to said record element.

9. In apparatus for translating vibrations between a record medium and a vibratable medium, the combination of, a translating device, record supporting means for removably positioning a flexible loop record element in a manner permitting movement of said element in a given path in cooperative relationship with said translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, conditioning means associated with said translating device for moving it into and out of a position of cooperative relationship with said record element, driving means for said record supporting means to move said element in said given path, and control means for said conditioning means and said driving means operatively associated with said adjusting means and automatically actuated by the operation thereof to record element release position for operating said conditioning means to move said translating device to non-cooperative position with respect to said record element and for rendering said driving means inoperative.

10. In apparatus for translating vibrations between a record medium and a vibratable medium, the combination of, a translating device, record supporting means for removably positioning a flexible loop record element in a manner permitting movement of said element in a given path in cooperative relationship with said translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, conditioning means associated with said translating device for moving it into and out of a position of cooperative relationship with said record element, driving means for said record supporting means to move said element in said given path including a clutch, and control means for said conditioning means and said clutch operatively associated with said adjusting means and automatically actuated by the operation thereof to record element release position for operating said conditioning means to move said translating device to non-cooperative position with respect to said record element and for disengaging said clutch subsequent to the operation of said conditioning means.

11. In apparatus for translating vibrations between a record medium and a vibratable medium, the combination of, a translating device, record supporting means for removably positioning a flexible loop record element in a manner permitting movement of said element in a given path in cooperative relationship with said translating device to translate vibrations therebetween and comprising parallel laterally spaced loop supporting members relatively movable in the plane of their axes for releasing said loop element to permit its removal from said supporting members, adjusting means operatively connected to said record supporting means for effecting relative movement of said members in said plane, conditioning means associated with said translating device for moving it into and out of a position of cooperative relationship with said record element, driving means for said record supporting means to move said element in said given path including a clutch, and control means for said conditioning means and said clutch operatively associated with said adjusting means and automatically actuated by the initial movement of said adjusting means toward record element removal position for operating said conditioning means to move said translating device to non-cooperative position with respect to said record element and for disengaging said clutch subsequent to the operation of said conditioning means and in advance of the disposition of said mounting means at removal position.

12. In apparatus for translating vibrations between a record medium and a vibratable medium, the combination of, a translating device, record supporting means for removably positioning a flexible loop record element in a manner permitting movement of said element in a given path in cooperative relationship with said translating device to translate vibrations therebetween and comprising relatively movable members adjustable to permit edgewise movement of said element for removal from said mounting means, adjusting means operatively connected to said supporting means for relatively positioning said movable members to permit said edgewise movement of said element for removal from said supporting means, conditioning means associated with said translating device for moving it into and out of a position of cooperative relationship with said record element, and control means for said conditioning means operatively associated with said adjusting means and automatically actuated by the initial movement of said adjusting means toward record element removal position for operating said conditioning means to move said translating device to non-cooperative position with respect to said record element in advance of the disposition of said supporting means at removal position.

13. In apparatus for translating vibrations between a record medium and a vibratable medium, the combination of, a plurality of drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, adjusting means for varying the axial distance between said drums, driving means operatively associated with said drums for moving said record element in said given path over said drums, and control means for said driving means operatively connected with said adjusting means and automatically actuated by operation thereof in varying said axial distance from said predetermined distance for rendering said driving means inoperative.

14. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, adjusting means for decreasing the axial distance between said drums, driving means operatively associated with said drums for moving said record element in said given path over said drums, and control means for said driving means operatively connected with said adjusting means and automatically actuated by operation thereof in decreasing said axial distance for rendering said driving means inoperative.

15. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums, a translating device, means for slidably mounting said translating device for movement in a path parallel to the axes of said drums and in cooperative relationship with said record element to translate vibrations therebetween, traversing means for moving said device in said path to traverse said record element, driving means operatively associated with said drums for moving said record element in said given path over said drums, adjusting means for varying the axial distance between said drums, and control means for said driving means and said traversing means operatively connected with said adjusting means and automatically actuated by operation thereof in varying said axial distance for rendering said driving means and said traversing means inoperative.

16. In apparatus for translating sound vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums, a vibratable stylus, means for vibratably mounting said stylus in cooperative relationship with said record element to translate sound vibrations therebetween, means for slidably mounting said stylus mounting means for movement in a path parallel to the axes of said drums, driving means operatively associated with one of said drums for rotating it to move said record element in said given path over said drums, traversing means for moving said slidable mounting means in its path in correlation with said driving means, adjusting means for decreasing the axial distance between said drums to permit removal of said record element therefrom, and control means for said driving means and said traversing means operatively connected with said adjusting means and automatically actuated by operation thereof in decreasing said axial distance for rendering said driving means and said traversing means inoperative.

17. In apparatus for translating sound vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, driving means operatively associated with one of said drums for rotating it to move said record element in said given path over said drums including a clutch, power means associated with said clutch to supply the power to engage it, means for locking said power means against operation, adjusting means for decreasing the axial distance between said drums to permit removal of said record element therefrom, and control means for said clutch and said locking means operatively connected with said adjusting means and automatically actuated by operation thereof in decreasing said axial distance to disengage said clutch and actuate said locking means.

18. In apparatus for translating sound vibrations between a record medium and a vibratable medium, the combination of, two horizontal drums positioned with their axes approximately parallel in a vertical plane and separated by a predetermined distance for movably supporting an endless flexible record element under tension to move in a given path over said drums and in cooperative relationship with a translating device to translate vibrations therebetween, comprising mounting means rotatably supporting one of said drums, and vertically adjustable supporting means mounted beneath said one drum for idly rotatably supporting said other drum, driving means operatively associated with the upper of said drums for rotating it to move said record element in said given path over said drums including a clutch, power means associated with said clutch to supply the power to engage it, means for locking said power means against operation, adjusting means for vertically adjusting said lower drum supporting means, and control means for said clutch and said locking means operatively connected with said adjusting means and automatically actuated by movement of said lower drum above a median position for disengaging said clutch and actuating said locking means, and by movement of said lower drum below said median position for actuating said locking means.

19. In apparatus for translating sound vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, driving means operatively associated with said drums for moving said record element in said given path over said drums, adjusting means for varying the axial distance between said drums to permit removal of said record element therefrom, control means for said driving means operatively connected with said adjusting means and automatically actuated by operation thereof in varying said axial distance for rendering said driving means inoperative, record removal means adjacent said drums for shifting a record element mounted thereon longitudinally of said drums to remove said record element therefrom, and means interconnecting said adjusting means and said record removal means to sequentially operate, first, said adjusting means to decrease the axial distance between said drums, second, said record removal means, and, third, said adjusting means to increase the axial distance between said drums.

20. In apparatus for translating sound vibrations between a record medium and a vibratable medium, the combination of, two horizontal drums positioned with their axes approximately parallel in a vertical plane and separated by a predetermined distance for movably supporting an endless flexible record element under tension to move in a given path over said drums and in cooperative relationship with a translating device to translate vibrations therebetween, comprising mounting means rotatably supporting one of said drums, and vertically adjustable supporting means mounted beneath said one drum for rotatably supporting said other drum, driving means operatively associated with the upper of said drums for rotating it to move said record element in said given path over said drums including a clutch, power means associated with said clutch to supply the power to engage it, means for locking said power means against operation, adjusting means for vertically adjusting said lower drum supporting means to raise and lower said drum, control means for said clutch and said locking means operatively connected with said adjusting means and automatically actuated by movement of said lower drum above a median position for disengaging said clutch and actuating said locking means, and by movement of said lower drum below said median position for actuating said locking means, record removal means adjacent said drums for shifting a record element mounted thereon longitudinally of said drums to remove said record element therefrom, and means interconnecting said adjusting means and said record removal means to sequentially operate, first, said adjusting means to raise said lower drum above said median position, second, said record removal means to remove said record element from said drums, and, third, said adjusting means to lower said lower drum below said median position.

21. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, biasing means exerting a force yieldingly urging said drums apart to hold said record element under tension when the axes of said drums are separated by said predetermined normal spacing, adjusting means operating against said biasing means for decreasing the normal axial distance between said drums to permit removal of said record element therefrom, driving means for rotating one of said drums to move said record element in said given path over said drums including a clutch, electric power means for supplying the power to disengage said clutch, an electric circuit for actuating said power means, and a control switch for energizing said circuit to actuate said power means operatively connected with said adjusting means and automatically actuated by operation thereof in decreasing said axial distance to operate said power means to disengage said clutch.

22. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, biasing means exerting a force yieldingly urging said drums apart to hold said record element under tension when the axes of said drums are separated by said predetermined normal spacing, adjusting means operating against said biasing means for decreasing the normal axial distance between said drums to permit removal of said record element therefrom, driving means for rotating one of said drums to move said record element in said given path over said drums including a clutch, electric power means for supplying the power to disengage said clutch, an electric circuit for actuating said power means, and means associated with said mounting means permitting said biasing means to separate said drums by more than said normal spacing upon removal of a record element therefrom, and a control switch in said circuit for actuating said power means operatively connected with said drums and automatically actuated by relative movement thereof in increasing said normal axial spacing to operate said power means to disengage said clutch.

23. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums and in cooperative relationship with a translating device to translate vibrations therebetween, biasing means exerting a force yieldingly urging said drums apart to hold said record element under tension when the axes of said drums are separated by said predetermined normal spacing, adjusting means operating against said biasing means for moving said drums toward each other to decrease the normal axial distance therebetween to permit removal of said record element therefrom, driving means for rotating one of said drums to move said record element in said given path over said drums including a clutch, electric power means for supplying the power to engage and disengage said clutch, mechanical irreversible motion transmitting means including lost motion connections operatively connecting said power means to said clutch to operate said clutch, an electric circuit for actuating said power means, and a control switch in said circuit to actuate said power means operatively connected to said drums and automatically actuated by movement thereof in decreasing said axial distance to actuate said power means to operate said clutch.

24. In apparatus for translating vibrations between a record medium and a vibratable medium, the combination of, two drums for supporting an endless flexible record element, mounting means rotatably positioning said drums with their axes approximately parallel and separated by a predetermined normal distance for movably supporting said record element under tension to move in a given path over said drums, biasing means exerting a force yieldingly urging said drums apart to hold said record element under tension when the axes of said drums are separated by said predetermined normal spacing, a translating device, means for slidably mounting said translating device for movement in a path parallel to the axes of said drums and in cooperative relationship with said record element to translate vibrations therebetween, traversing means for moving said device in said path to traverse said record element, driving means for rotating one of said drums to move said record element in said given path over said drums and moving said traversing means in correlation therewith including a clutch, backspacing mechanism operatively connected with said translating device for moving it in a direction opposite the motion caused by said traversing means, electric control means for said clutch and said backspacing mechanism, adjusting means operating against said biasing means for decreasing the normal axial distance between said drums to permit removal of said record element therefrom, and locking means in said electric control means operatively connected with said adjusting means and automatically actuated by operation thereof in decreasing said axial distance to render said electric control means inoperative.

25. In apparatus for translating vibrations between a record medium and a vibratable medium, the combination of, two drums for supporting an endless flexible record element, mounting means rotatably positioning said drums with their axes approximately parallel and separated by a predetermined normal distance for movably supporting said record element under tension to move in a given path over said drums, biasing means exerting a force yieldingly urging said drums apart to hold said record element under tension when the axes of said drums are separated by said predetermined normal spacing, a translating device, means for slidably mounting said translating device for movement in a path parallel to the axes of said drum and in cooperative relationship with said record element to translate vibrations therebetween, traversing means for moving said device in said path to traverse said record element, driving means for rotating one of said drums to move said record element in said given path over said drums and moving said traversing means in correlation therewith including a clutch, backspacing mechanism operatively connected with said translating device for moving it in a direction opposite the motion caused by said traversing means, electric control means for said clutch and said backspacing mechanism, adjusting means operating against said biasing means for decreasing the normal axial distance between said drums to permit removal of said record element therefrom, means associated with said mounting means permitting said biasing means to separate said drums by more than their normal spacing upon removal of a record element therefrom, and locking means in said electric control means operatively connected with said drums and automatically actuated by relative movement thereof in increasing said normal axial spacing to render said electric control means inoperative.

26. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums, biasing means exerting a force yieldingly urging said drums apart to hold said record element under tension when the axes of said drums are separated by said predetermined normal spacing, a translating device, means for slidably mounting said translating device for movement in a path parallel to the axes of said drums and in cooperative relationship with said record element to translate vibrations therebetween, traversing means for moving said device in said path to traverse said record element, driving means for rotating one of said drums to move said record element in said given path over said drums and moving said transversing means in correlation therewith, backspacing mechanism operatively connected with said translating device for moving it in a direction opposite the motion caused by said traversing means, adjusting means operating against said biasing means for decreasing the normal axial distance between said drums to permit removal of said record element therefrom, and control means for said backspacing mechanism operatively connected with said adjusting means and automatically actuated by operation thereof in decreasing said axial distance to operate said backspacing mechanism.

27. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums, biasing means exerting a force yieldingly urging said drums apart to hold said record element under tension when the axes of said drums are separated by said predetermined normal spacing, a translating device, means for slidably mounting said translating device for movement in a path parallel to the axes of said drums and in cooperative relationship with said record element to translate vibrations therebetween, traversing means for moving said device in said path to traverse said record element, driving means for rotating one of said drums to move said record element in said given path over said drums and moving said traversing means in correlation therewith, backspacing mechanism operatively connected with said translating device for moving it in a direction opposite the motion caused by said traversing means, adjusting means operating against said biasing means for decreasing the normal axial distance between said drums to permit removal of said record element therefrom, means associated with said mounting means permitting said biasing means to separate said drums by more than their normal spacing upon removal of a record element therefrom, and control means for said backspacing mechanism operatively connected with said drums and automatically actuated by relative movement thereof in increasing said normal axial spacing to operate said backspacing mechanism.

28. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums, biasing means exerting a force yieldingly urging said drums apart to hold said record element under tension when the axes of said drums are separated by said predetermined normal spacing, a translating device, means for slidably mounting said translating device for movement in a path parallel to the axes of said drums and in cooperative relationship with said record element to translate vibrations therebetween, traversing means for moving said device in said path to traverse said record element, conditioning means on said slidable mounting means for moving said translating device into and out of a position of cooperative relationship with said record element, driving means for rotating one of said drums to move said record element in said given path over said drums and moving said traversing means in correlation therewith, adjusting means operating against said biasing means for decreasing the normal axial distance between said drums to permit removal of said record element therefrom, means associated with said mounting means permitting said biasing means to separate said drums by more than their normal spacing upon removal of a record element therefrom, and control means for said conditioning means operatively connected with said drums and automatically actuated by relative movement thereof in increasing said normal axial spacing to operate said conditioning means to move said translating device to noncooperative position.

29. In apparatus for translating vibrations between a record medium and a vibratable medium, the combination of, mounting means for removably positioning a record element in a manner permitting movement of said element in a given path in cooperative relationship with a translating device to translate vibrations therebetween and comprising relatively movable members adjustable to permit movement of said element in a direction away from said path for removal from said mounting means, adjusting means operatively connected to said mounting means for relatively positioning said movable members to permit movement of said element in said removal direction for removal from said mounting means, driving means for moving said mounting means to move said element in said given path including a clutch, first power means connected to said clutch for supplying the power to engage it, second power means connected to said clutch for supplying the power to disengage it, a first solenoid associated with said first power means for initiating its operation, a second solenoid associated with said second power means for initiating its operation, a common electric circuit connecting said solenoids in shunt, switch means connected in said circuit operatively associated with said adjusting means and automatically actuated by operation thereof to record element removal position to sequentially open said shunt connection to said first solenoid, close the shunt connection to said second solenoid, and open said common electric circuit, and a manually controlled switch connected in series with said first solenoid.

30. In apparatus for translating vibrations between a record medium and a vibratable medium, the combination of, mounting means for removably positioning a record element in a manner permitting movement of said element in a given path in cooperative relationship with a translating device to translate vibrations therebetween and comprising relatively movable members adjustable to permit movement of said elements in a direction away from said path for removal from said mounting means, adjusting means operatively connected to said mounting means for relatively positioning said movable member to permit movement of said element in said removal direction for removal from said mounting means, a translating device, traversing means for moving said translating device to traverse a record element mounted on said mounting means, driving means for moving said mounting means to move said element in said given path and to move said traversing means in correlation therewith including a clutch, backspacing mechanism operatively connected with said translating device for moving it in a direction opposite the motion caused by said traversing means, first power means connected to said clutch for supplying the power to engage it, second power means associated with said clutch and said backspacing mechanism for supplying power to disengage said clutch and operate said backspacing mechanism, third power means connected to said clutch for supplying the power to disengage it, a first solenoid associated with said first power means for initiating its operation, a second solenoid associated with said second power means for initiating its operation, a third solenoid associated with said third power means for initiating its operation, a common electric circuit connecting said solenoids in shunt, switch means connected in said circuit operatively associated with said adjusting means and automatically actuated by operation thereof to record element removal position to sequentially open said shunt connection to said first solenoid, close said shunt connection to said second solenoid, and open said common electric circuit, a first manually controlled switch connected in series with said first solenoid, a second manually controlled switch connected in series with said third solenoid, a third manually controlled switch parallel-connected with the circuit of said second solenoid, and a two-position switch series-connected in the circuits of said first and third solenoids mechanically operated by operation of said clutch into and out of engagement to complete the circuit to said first solenoid and open the circuit to said second solenoid as said clutch is disengaged, and to open the circuit to said first solenoid and close the circuit to said second solenoid as said clutch is engaged.

31. In apparatus for translating the vibrations between a record medium and a vibratable medium, the combination of, mounting means for removably positioning a record element in a manner permitting movement of said element in a given path in cooperative relationship with a translating device to translate vibrations therebetween and comprising relatively movable members adjustable to permit movement of said elements in a direction away from said path for removal from said mounting means, adjusting means operatively connected to said mounting means for relatively positioning said movable member to permit movement of said element in said removal direction for removal from said mounting means, a translating device, traversing means for moving said translating device to traverse a record element mounted on said mounting means, driving means for moving said mounting means to move said element in said given path and to move said traversing means in correlation therewith including a clutch, backspacing mechanism operatively connected with said translating device for moving it in a direction opposite the motion caused by said traversing means, first power means connected to said clutch for supplying the power to engage it, second power means associated with said clutch and said backspacing mechanism for supplying power to disengage said clutch and operate said backspacing mechanism, third power means connected to said clutch for supplying the power to disengage it, a first solenoid associated with said first power means for initiating its operation, a second solenoid associated with said second power means for initiating its operation, a third solenoid associated with said third power means for initiating its operation, three electric circuits, one for each of said solenoids respectively, first switch means connected in said circuits and associated with said traversing means and operated by traversing motion of said translating device at the forward limit of its travel to sequentially open said circuit to said first solenoid and close said circuit to second second solenoid to disengage said clutch and operate said backspacing mechanism, second switch means connected in said circuits and associated with said backspacing mechanism and operated by backspacing motion of said translating device from said forward limit position to sequentially open the circuit to said second solenoid and close the circuit to said first solenoid to render said backspacing mechanism inoperative and engage said clutch, a first manually controlled switch connected in said circuit in series with said first solenoid, a second manually controlled switch connected in said circuit in series with said third solenoid, said manually controlled switches being mechanically interconnected to provide that when either one is open the other is closed, a third manually controlled switch parallel-connected in the circuit of said second solenoid, and a two-position switch connected in series with said first and second solenoids and operatively connected to said clutch to close said first solenoid circuit and open said second solenoid circuit when said clutch is disengaged and to open said first solenoid circuit and close said second solenoid circuit when said clutch is engaged.

32. In apparatus for translating vibrations between a record medium and a vibratable medium, the combination of, two drums for supporting an endless flexible record element, mounting means rotatably positioning said drums with their axes approximately parallel and separated by a predetermined distance for movably supporting said record element under tension to move in a given path over said drums in cooperative relationship with a translating device to translate vibrations therebetween, biasing means exerting a force yieldingly urging said drums apart to hold said record element under tension when the axes of said drums are separated by said predetermined normal spacing, and adjustment means for varying the center distance between said drums at one end thereof with respect to the center distance at the other end to produce an uneven tension across said record element.

33. In apparatus for translating vibrations of audio frequency between a record medium and a vibratable medium, in combination, a translating device, a traversably mounted carriage for said device, means for mounting a record element in cooperative movable relationship to said device, power means, means for operatively connecting said power means to traverse the carriage forwardly, backspacing mechanism operable by said power means to move the carriage backward step by step a predetermined interval at each step and render said power connecting means inoperative to traverse the carriage forwardly, means operable by the carriage at the forward limit of its traverse to set said backspacing mechanism in operation, means operable in response to backspace movement of the carriage to reconnect said power connecting means and effect forward movement of said carriage, and independent manual means for controlling the operation of said power connecting means.

34. In apparatus for translating vibrations of audio frequency between a record medium and a vibratable medium, in combination, a translating device; a traversably mounted carriage for said device; means for mounting a record element in cooperative movable relationship to said device; means for adjusting said apparatus alternatively to a condition for recording or a condition for reproducing, power means; means for operatively connecting said power means to effect forward traverse of the carriage and operative movement of said record element; backspacing mechanism operable by said power means to move the carriage backward step by step a predetermined interval at each step, move said device adjusting means to the reproducing position and render said power connecting means inoperative to traverse the carriage forwardly; means operable by the carriage at the forward limit of its traverse to set said backspacing mechanism in operation, means operable in response to backspace movement of the carriage to reconnect said power connecting means for restoring forward movement of the carriage and operative movement of said record element moving means, and independent manual means for controlling said power connecting means.

35. In apparatus for translating vibrations between a record medium and a vibratable medium, mounting means for an endless loop record element adapted gravitally to hold said loop in a state of tension comprising an upper drum rotatable about a fixed horizontal axis and a lower drum rotatable about a horizontal axis movable laterally in parallelism with said upper drum, power means for rotating one of said drums, and means for moving the lower drum bodily toward the upper drum.

36. In apparatus for translating vibrations between a record medium and a vibratable medium, the combination of, two laterally spaced axially parallel revolvable drums mounted one below the other to provide a force flexibly urging them apart for supporting at normal spacing an endless flexible loop under tension in a manner to drive said loop, means for varying the spacing from said normal spacing, power means for driving at least one of said drums, electrically energized control means for said power means, and means responsive to the disposition of said drums at a distance other than said normal spacing for deenergizing said control means.

37. In apparatus for translating vibrations of audio frequency between a record medium and a vibratable medium, in combination, a translating device, a traversably mounted carriage for said device, means for mounting a record element in cooperative movable relationship to said device, power means, means for operatively connecting said power means to traverse the carriage forwardly, backspacing mechanism operable by said power means to move the carriage backward and render said power connecting means inoperative to traverse the carriage forwardly, means operable by the carriage at the forward limit of its traverse to set said backspacing mechanism in operation and to discontinue operation of said backspacing mechanism after a limited extent of backspace movement, means operable in response to said limited backspace movement of the carriage to reconnect said power connecting means and effect forward movement of said carriage, and independent manual means for controlling the operation of said power connecting means.

38. In an apparatus for translating vibrations between a record medium and a vibratable medium, the combination of, a stylus, a traversable carriage for said stylus, a first revolvable drum mounted with its axis parallel to said traverse direction, a second revolvable drum mounted with its axis in substantial parallelism to said first drum, said drums being relatively movable toward and away from one another, means providing a force flexibly urging said drums apart, said drums being disposed to carry a flexible endless loop element under tension in a path at one point of which it has sliding contact with said stylus, power means for rotating at least one of said drums and traversing said carriage, and adjusting means for varying the degree of parallelism of said drums.

39. In an apparatus for translating vibrations between a record medium and a vibratable medium, supporting means for an endless record loop comprising a frame, an upper drum revolvably mounted in bearing means stationarily carried by said frame, a lower drum revolvably carried by movable bearing means, a shaft oscillatably mounted in said frame parallel to said drums and therebetween, parallel arms rigidly mounted on the ends of said shaft respectively, suspending means of equal length between said arms and the ends of said movable bearing means for maintaining parallelism of said drums, means for adjusting one of said drums slightly out of parallelism with the other thereof, and power means for rotating said upper drum.

SIMON YERKOVICH.